US006794965B2

(12) United States Patent
Shen et al.

(10) Patent No.: US 6,794,965 B2
(45) Date of Patent: Sep. 21, 2004

(54) MICRO-MAGNETIC LATCHING SWITCH WITH RELAXED PERMANENT MAGNET ALIGNMENT REQUIREMENTS

(75) Inventors: Jun Shen, Phoenix, AZ (US); Meichun Ruan, Tempe, AZ (US); Charles Wheeler, Paradise Valley, AZ (US)

(73) Assignee: Arizona State University, Tempe, AZ (US)

(*) Notice: Subject to any disclaimer, the term of this patent is extended or adjusted under 35 U.S.C. 154(b) by 96 days.

(21) Appl. No.: 10/051,447

(22) Filed: Jan. 18, 2002

(65) Prior Publication Data

US 2002/0121951 A1 Sep. 5, 2002

Related U.S. Application Data
(60) Provisional application No. 60/262,776, filed on Jan. 18, 2001, provisional application No. 60/280,399, filed on Mar. 30, 2001, and provisional application No. 60/307,181, filed on Jul. 24, 2001.

(51) Int. Cl.[7] .............................................. H01H 51/22
(52) U.S. Cl. ...................................... 335/78; 200/181
(58) Field of Search ........................... 335/78, 124, 80; 200/181; 361/233; 257/414, 421, 531, 417, 532; 359/224

(56) References Cited

U.S. PATENT DOCUMENTS

| | | |
|---|---|---|
| 4,065,677 A | 12/1977 | Micheron et al. |
| 4,461,968 A | 7/1984 | Kolm et al. |
| 4,570,139 A | 2/1986 | Kroll |
| 5,016,978 A | 5/1991 | Fargette et al. |
| 5,398,011 A | 3/1995 | Kimura et al. |
| 5,472,539 A | 12/1995 | Saia et al. |
| 5,475,353 A | 12/1995 | Roshen et al. |
| 5,557,132 A | 9/1996 | Takahashi |

(List continued on next page.)

FOREIGN PATENT DOCUMENTS

| | | |
|---|---|---|
| DE | 19 820821 C | 12/1999 |
| EP | 0 685 864 A | 12/1995 |
| EP | 0 780 858 A | 6/1997 |
| EP | 0 869 519 A | 10/1998 |
| JP | 06251684 A | 9/1994 |
| WO | 97 39468 A | 10/1997 |
| WO | 98 34269 A | 8/1998 |
| WO | 99 27548 A | 6/1999 |

OTHER PUBLICATIONS

Ruana, M. et al, "Latching Microelectromagnetic Relays"; Technical Digest, Solid–State Sensor and Actuator Workshop; Hilton Head Island, SC, USA; Jun. 4–8, 2000; vol. A91, No. 3, pp. 346–350.

International Search Report; PCT/US02/01359; Jun. 5, 2002; 4 pgs.

(List continued on next page.)

*Primary Examiner*—Lincoln Donovan
(74) *Attorney, Agent, or Firm*—Ingrassia Fisher & Lorenz, P.C.

(57) ABSTRACT

A micro magnetic latching device. The device comprises a substrate having a moveable element supported thereon. The moveable element (cantilever) has a long axis and a magnetic material. The device also has first and second magnets that produce a first magnetic field, which induces a magnetization in the magnetic material. The magnetization is characterized by a magnetization vector pointing in a direction along the long axis of the moveable element, wherein the first magnetic field is approximately perpendicular to a major central portion of the long axis. The device also has a coil that produces a second magnetic field to switch the movable element between two stable states, wherein only temporary application of the second magnetic field is required to change direction of the magnetization vector thereby causing the movable element to switch between the two stable states.

9 Claims, 29 Drawing Sheets

U.S. PATENT DOCUMENTS

| | | | |
|---|---|---|---|
| 5,629,918 A | | 5/1997 | Ho et al. |
| 5,818,316 A | | 10/1998 | Shen et al. |
| 5,838,847 A | | 11/1998 | Pan et al. |
| 5,847,631 A | | 12/1998 | Taylor et al. |
| 5,945,898 A | | 8/1999 | Judy et al. |
| 6,016,092 A | | 1/2000 | Qiu et al. |
| 6,028,689 A | | 2/2000 | Michalicek et al. |
| 6,031,652 A | * | 2/2000 | Furlani et al. ............... 359/224 |
| 6,084,281 A | | 7/2000 | Fullin et al. |
| 6,094,116 A | | 7/2000 | Tai et al. |
| 6,124,650 A | | 9/2000 | Bishop et al. |
| 6,143,997 A | | 11/2000 | Feng et al. |
| 6,160,230 A | | 12/2000 | McMillan et al. |

OTHER PUBLICATIONS

Ching H. Ahn and Mark G. Allen, "A Fully Integrated Micromagnetic Actuator With a Multilevel Meander Magnetic Actuator With a Multilevel Meander Magnetic Core", Jun. 1992, IEEE Solid–State Sensor and Actuator Workshop, pp. 14–17.

William P. Taylor and Mark G. Allen, "Integrated Magnetic Microrelays: Normally Open, Normally Closed, and Multi–Pole Devices", Jun. 1997, IEEE International Conference on Solid–State Sensors and Actuators, pp. 1149–1152.

Jack W. Judy and Richard S. Muller "Magnetically Actuated, Addressable Microstructures", Sep. 1997, Journal of Microelectromechanical Systems, vol. 6, No. 3, Sep. 1997, pp. 249–255.

John A. Wright and Yu–Chong Tai, "Micro–Miniature Electromagnetic Switches Fabricated Using MEMS Technology", 46th Annual International Relay Conference: NARM '98, Apr. 1998.

John A. Wright, Yu–Chong Tai and Gerald Lillienthal, "A Magnetostatic MEMS Switch for DC Brushless Motor Commutation", Solid State Source and Actuator Workshop 1998, Jun. 1998.

Laure K. Lagorce, Oliver Brand, and Mark G. Allen, "Magnetic Microactuators Based on Polymer Magnets", IEEE Journal of MIcroelectromechanical Systems, vol. 8, No. 1, Mar. 1999, pp 2–9.

E. Fullin, J. Gobet, HAC Tilmans, and J. Bergqvist, "A New Basic Technology for Magnetic Micro–Actuators", pp 143–147, (no date).

"P10D Electricity & Magnetism Lecture 14", Internet Source: http://scitec.uwichill.edu.bb/cmp/online/P10D/Lecture14/lect14.htm, Jan. 3, 2000, pp 1–5.

Richard P. Feynman, "There's Plenty of Room at the Bottom", Dec. 29, 1959, pp. 1–12, Internet Source: http://www.zyvex.com/nanotech/feynman.html.

William Trimmer, "The Scaling of Micromechanical Devices", Sensors and Actuators, vol. 19, No. 3, Sep. 1989, pp. 267–287, taken from the Internet Source: http://home.e-arthlink.net/–trimmerw/mems/scale.html.

William P. Taylor, Olivery Brand, and Mark G. Allen, "Fully Integrated Magnetically Actuated Micromachined Relays", Journal of Microelectromechanical Systems, vol. 7, No. 2, Jun. 1998, pp. 181–191.

John A. Wright, Yu–Chong Tai, and Shih–Chia Chang, "A Large–Force, Fully–Integrated MEMS Magnetic Actuator", 1997 International Conference on Solid–State Sensors and Actuators, Chicago, Jun. 1997, pp. 793–796.

Tilmans, et al., "A Fully–Packaged Electromagnetic Microrelay", IEEE 1999, pp 25–30, (no month).

Xi–Qing Sun, KR Farmer, and WN Carr, "A Bistable Microrelay Based on Two–Segment Multimorph Cantilever Actuators", 1998 IEEE, pp. 154–159, (no month).

Ezekiel JJ Kruglick and Kristofer SJ Pister, "Bistable MEMS Relays and Contact Characterization", Hilton Head 98 and 19th International Conference on Electric Contact Phenomena, 5 pgs., (no month).

"Ultraminiatore Magnetic Latching To–5 Relays SPDT DC to C Band", Series RF341, product information from Teledyne Relays, 1998, (no month).

* cited by examiner

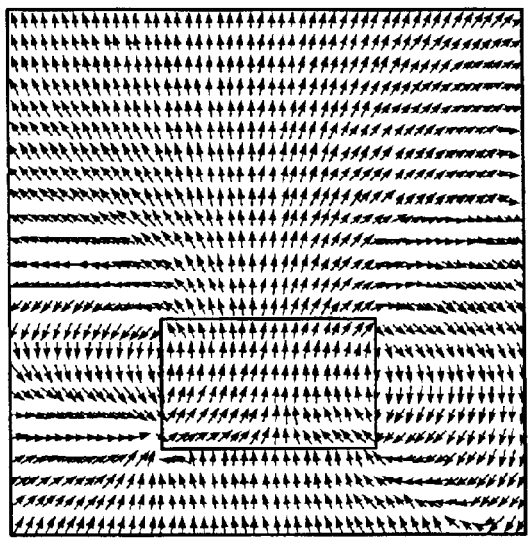 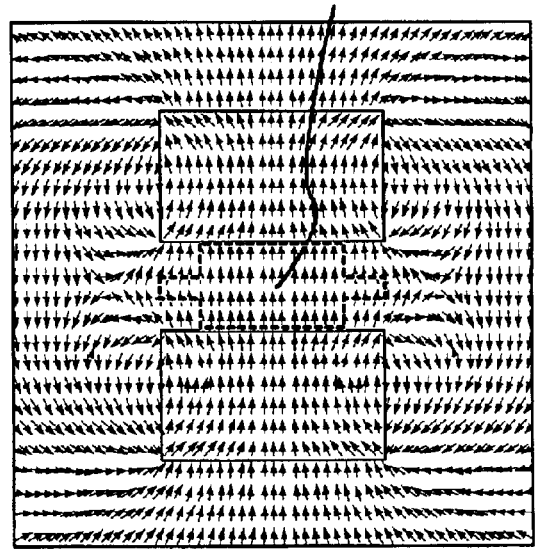
FIG.14A        FIG.14B
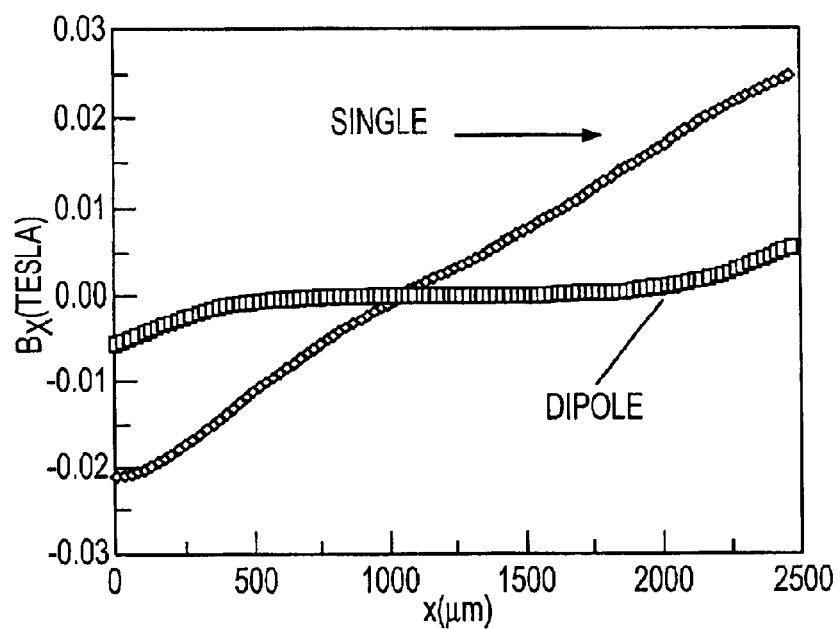
FIG.14C

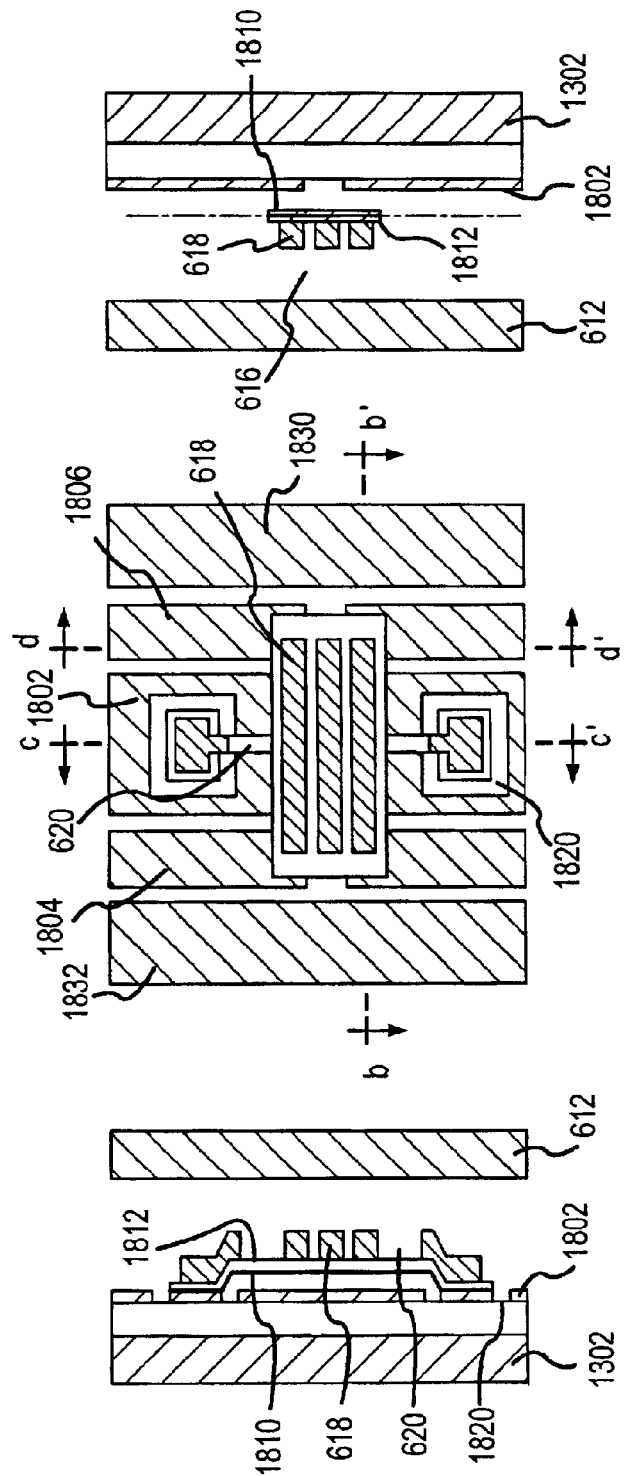

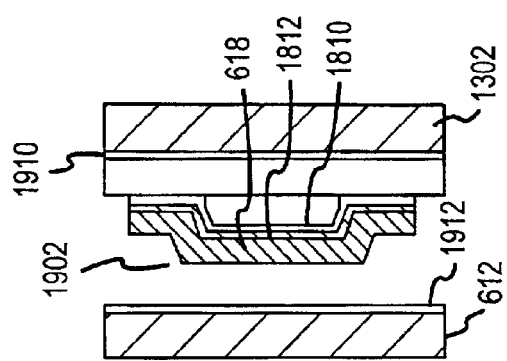
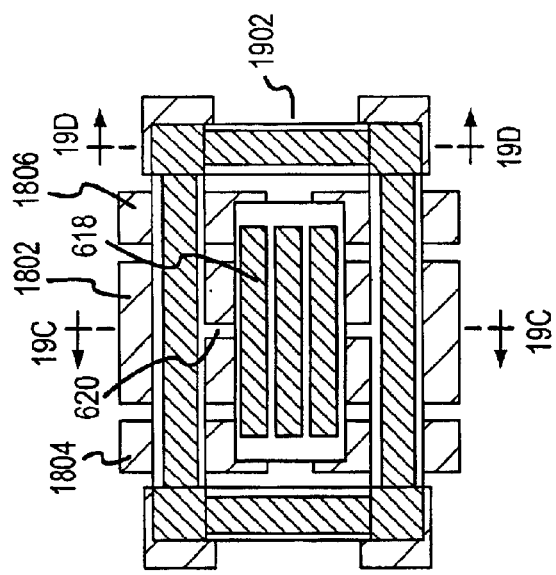
FIG.19A
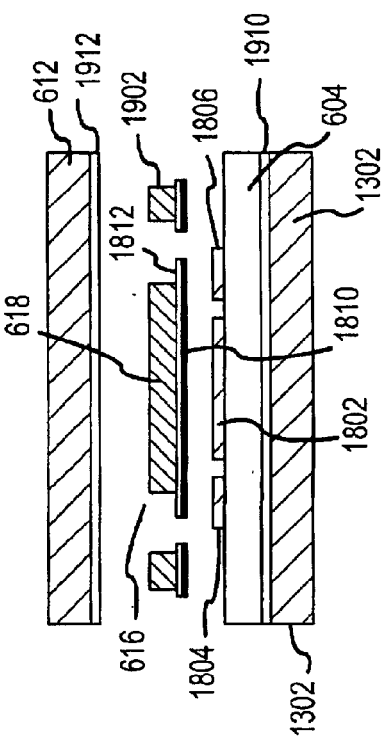
FIG.19B
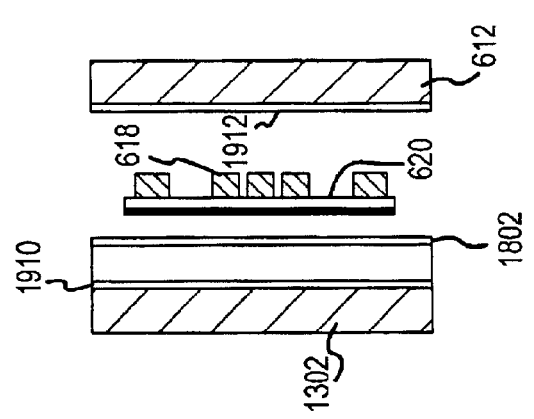
FIG.19C
FIG.19D

US 6,794,965 B2

MICRO-MAGNETIC LATCHING SWITCH WITH RELAXED PERMANENT MAGNET ALIGNMENT REQUIREMENTS

CROSS-REFERENCE TO RELATED APPLICATIONS

This application claims priority to U.S. Provisional Pat. Application Nos. 60/262,776 (filed Jan. 18, 2001), 60/280, 399 (filed Mar. 30, 2001), and 60/307,181 (filed Jul. 24, 2001), which are all incorporated herein by reference.

Partial funding for the development of this invention was provided by U.S. Government Grant Numbers Air Force F29601-00-C-0132 F29601-01-C-0032; F29601-00-C-0033 and DAAH01-00-C-R190, with the United States Air Force; and the United States Government may own certain rights to this invention.

BACKGROUND OF THE INVENTION

1. Field of the Invention

The present invention relates to electronic and optical switches. More specifically, the present invention relates to micro-magnetic latching switches with relaxed permanent magnet alignment requirements.

2. Background Art

Switches are typically electrically controlled two-state devices that open and close contacts to effect operation of devices in an electrical or optical circuit. Relays, for example, typically function as switches that activate or de-activate portions of electrical, optical or other devices. Relays are commonly used in many applications including telecommunications, radio frequency (RF) communications, portable electronics, consumer and industrial electronics, aerospace, and other systems. More recently, optical switches (also referred to as "optical relays" or simply "relays" herein) have been used to switch optical signals (such as those in optical communication systems) from one path to another.

Although the earliest relays were mechanical or solid-state devices, recent developments in micro-electro-mechanical systems (MEMS) technologies and microelectronics manufacturing have made micro-electrostatic and micro-magnetic relays possible. Such micro-magnetic relays typically include an electromagnet that energizes an armature to make or break an electrical contact. When the magnet is de-energized, a spring or other mechanical force typically restores the armature to a quiescent position. Such relays typically exhibit a number of marked disadvantages, however, in that they generally exhibit only a single stable output (i.e., the quiescent state) and they are not latching (i.e., they do not retain a constant output as power is removed from the relay). Moreover, the spring required by conventional micro-magnetic relays may degrade or break over time.

Another micro-magnetic relay is described in U.S. Pat. No. 5,847,631, (the '631 patent) issued to Taylor et al. on Dec. 8, 1998, the entirety of which is incorporated herein by reference. The relay disclosed in this patent includes a permanent magnet and an electromagnet for generating a magnetic field that intermittently opposes the field generated by the permanent magnet. The replay must consume power in the electromagnet to maintain at least one of the output states. Moreover, the power required to generate the opposing field would be significant, thus making the relay less desirable for use in space, portable electronics, and other applications that demand low power consumption.

The basic elements of a micro-magnetic latching switch include a permanent magnet, a substrate, a coil, and a cantilever at least partially made of soft magnetic materials. In its optimal configuration, the permanent magnet produces a static magnetic field that is relatively perpendicular to the horizontal plane of the cantilever. However, the magnetic field lines produced by a permanent magnet with a typical regular shape (disk, square, etc.) are not necessarily perpendicular to a plane, especially at the edge of the magnet. Then, any horizontal component of the magnetic field due to the permanent magnet can either eliminate one of the bistable states, or greatly increase the current that is needed to switch the cantilever from one state to the other. Careful alignment of the permanent magnet relative to the cantilever so as to locate the cantilever in the right spot of the permanent magnet field (usually near the center) will permit bi-stability and minimize switching current. Nevertheless, high-volume production of the switch can become difficult and costly if the alignment error tolerance is small.

What is desired is a bi-stable, latching switch with relaxed permanent magnet alignment requirements. Such a switch should also be reliable, simple in design, low-cost and easy to manufacture, and should be useful in optical and/or electrical environments.

BRIEF SUMMARY OF THE INVENTION

The micro-magnetic latching switches of the present invention can be used in a plethora of products including household and industrial appliances, consumer electronics, military hardware, medical devices and vehicles of all types, just to name a few broad categories of goods. The micro-magnetic latching switches of the present invention have the advantages of compactness, simplicity of fabrication, and have good performance at high frequencies, which lends them to many novel applications in many RF applications.

The present invention is directed to a micro magnetic latching device. The device, or switch, comprises a substrate having a moveable element supported thereon. The moveable element, or cantilever, has a long axis and a magnetic material. The device also has first and second magnets that produce a first magnetic field, which induces a magnetization in the magnetic material. The magnetization is characterized by a magnetization vector pointing in a direction along the long axis of the moveable element, wherein the first magnetic field is approximately perpendicular to a major central portion of the long axis. The device also has a coil that produces a second magnetic field to switch the movable element between two stable states, wherein only temporary application of the second magnetic field is required to change direction of the magnetization vector thereby causing the movable element to switch between the two stable states.

In one embodiment, the first magnet is a permanent magnet that is substantially planar and substantially parallel to the substrate.

In another embodiment, the first and the second magnets are permanent magnets that are substantially planar and substantially parallel to the substrate. In this embodiment the moveable element and the substrate are located between the first and the second magnets.

In another embodiment, the second magnet is a permalloy layer that is substantially planar and substantially parallel to the substrate.

In still another embodiment, the permalloy layer is located between the substrate and the movable element.

In yet another embodiment, the permalloy layer is located on an opposite side of the substrate from a side of the substrate that supports the movable element.

In a further embodiment, the movable element is located between the permalloy layer and the substrate, and the permanent magnet is located on an opposite side of the substrate from a side of the substrate that supports the movable element.

In another embodiment, the permanent magnet is located on an opposite side of the substrate from a side of the substrate that supports the movable In still another embodiment, the device further comprises a second permalloy layer located on an opposite side of the substrate from a side of the substrate that supports the movable element.

In yet another embodiment, the movable element is located between the permalloy layer and the permanent magnet.

In another embodiment, the movable element is located between the substrate and the permanent magnet.

In still another embodiment, the device further comprises a second permalloy layer located between the permanent magnet and the moveable element.

In another embodiment, the device further comprises a second permalloy layer located on an outer side of the permanent magnet.

In yet another embodiment, the substrate comprises raised structures that support the moveable element.

In another embodiment, the device further comprises a pair of ground planes that sandwich the moveable element.

In still another embodiment, the permalloy layer comprises alternating discrete sections of soft magnetic material and sections of non-magnetic material, wherein the alternating sections are located along the long axis.

In another embodiment, the second permalloy layer comprises alternating discrete sections of soft magnetic material and sections of non-magnetic material, wherein the alternating sections are located along the long axis.

In yet another embodiment, the device further comprises a plurality of moveable elements supported by the substrate.

In still another embodiment, the device further comprises a plurality of moveable elements supported by the substrate.

In another embodiment, the device further comprises a plurality of moveable elements supported by the substrate, and wherein the permalloy layer comprises a plurality of laterally spaced sections, individual ones of the laterally spaced sections being in relaxed alignment with a corresponding one of the plurality of moveable elements.

In yet another embodiment, the device further comprises a plurality of moveable elements supported by the substrate, and wherein the permanent magnet comprises a plurality of laterally spaced sections, individual ones of the laterally spaced sections being aligned with a corresponding one of the plurality of moveable elements.

In still another embodiment, the device further comprises a plurality of moveable elements supported by the substrate, and wherein the permanent magnet comprises a plurality of laterally spaced first sections, individual ones of the first sections being aligned with a corresponding one of the plurality of moveable elements, and wherein the permanent magnet comprises a plurality of laterally spaced second sections, individual ones of the second sections being in relaxed alignment with a corresponding one of the plurality of moveable elements.

In another embodiment, the device further comprises a plurality of moveable elements supported by the substrate.

In yet embodiment, the device further comprises a plurality of moveable elements supported by the substrate, and wherein the permalloy layer comprises a plurality of laterally spaced sections, individual ones of the sections being in relaxed alignment with a corresponding one of the plurality of moveable elements.

In another embodiment, the device further comprising a plurality of moveable elements supported by the substrate, and wherein the permanent magnet comprises a plurality of laterally spaced sections, individual ones of the sections being in relaxed alignment with a corresponding one of the plurality of moveable elements.

In still another embodiment, the device further comprises a plurality of moveable elements supported by the substrate, and wherein the permanent magnet comprises a plurality of laterally spaced first sections, individual ones of the first sections being in relaxed alignment with a corresponding one of the plurality of moveable elements, and wherein the permanent magnet comprises a plurality of laterally spaced second sections, individual ones of the second sections being in relaxed alignment with a corresponding one of the plurality of moveable elements.

In a further embodiment, the coil comprises an "S-shaped" configuration. Alternatively, the coil comprises an a single coil line.

In yet another embodiment, the magnetic material comprises a permalloy. Still further, the permalloy can comprise a plurality of strips on the moveable element and aligned parallel to the long axis.

In a further embodiment, the first and second magnets are permanent magnets that are located on the substrate, and the moveable element is located between the first and second permanent magnets, each of the first and second permanent magnets having a respective long axis parallel to the long axis of the moveable element, wherein the switching between the two stable states causes the moveable element to move in a plane substantially parallel to the substrate.

In another embodiment, the coil is located on an opposite side of the moveable element from a side thereof that is supported by the substrate.

In still another embodiment, the device further comprises permalloy layers located perpendicular to the substrate and laterally spaced from the moveable element.

In yet another embodiment, the device further includes a buffer layer located between the permalloy layer and the substrate.

In another embodiment, the magnetic material comprises a permalloy having a reflective layer thereon, wherein the device functions as an optical switch when light impinges on the reflective layer such that switching the movable element between the two stable states causes the impinging light to be reflected in one of at least two different directions.

Alternatively, the magnetic material comprises a permalloy having a reflective layer thereon, and the permanent magnet having a slit located proximate to the reflective layer, wherein the device functions as an optical switch when light passed through the slit and impinges the reflective layer such that switching the movable element between the two stable states causes the impinging light to be reflected in one of at least two different directions back through the slit.

In another embodiment, the device includes a cylindrical magnet, having a center axis, that laterally encloses the moveable element such that the center axis passes through a central portion of the moveable element and is perpendicular to the substrate. The cylindrical magnet produces a first magnetic field that induces a magnetization in the magnetic material, the magnetization characterized by a vector pointing in a direction along the long axis of the moveable element, wherein the first magnetic field is approximately perpendicular to a major central portion of the long axis. In this embodiment, a coil that produces a second magnetic field to switch the movable element between two stable states, wherein only temporary application of the second magnetic field is required to change direction ofthe magnetization vector thereby causing the movable element to switch between the two stable states.

In still another embodiment, the device further comprising a first permalloy layer located on an opposite side of the substrate from a side of the substrate that supports the movable element, and a second permalloy layer located on an opposite side ofthe moveable element from a side thereof that is supported by the substrate.

These and other objects, advantages and features will become readily apparent in view of the following detailed description of the invention.

BRIEF DESCRIPTION OF THE FIGURES

The features and advantages ofthe present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 14A–C shows simulation results confirming the usefulness of the magnetic dipoles in producing the uniform magnetic fields according to the present invention.

FIGS. 18A–D show an embodiment that incorporates transmission lines suitable for transmitting radio frequency (RF) signals according to the present invention.

FIGS. 19A–D show another embodiment that incorporates transmission lines suitable for transmitting radio frequency (RF) signals according to the present invention.

FIG. 34 shows a method to relax alignment tolerance of the CPW switch of FIG. 33 according to the present invention.

FIG. 35 shows a planar dielectric layer used to separate the top conductor from the underlying ground plane according to the present invention.

DETAILED DESCRIPTION OF THE INVENTION

Introduction

Figure 1A:
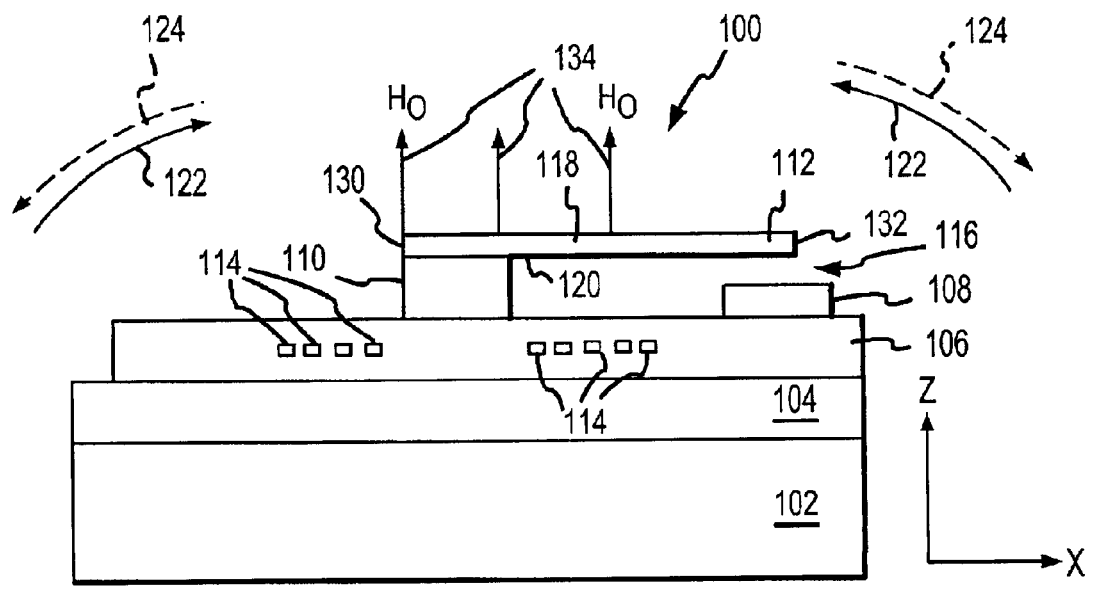
FIGS. 1A and 1B are side and top views, respectively, of an exemplary embodiment of a switch.

It should be appreciated that the particular implementations shown and described herein are examples of the invention and are not intended to otherwise limit the scope of the present invention in any way. Indeed, for the sake of brevity, conventional electronics, manufacturing, MEMS technologies and other functional aspects of the systems (and components of the individual operating components of the systems) may not be described in detail herein. Furthermore, for purposes of brevity, the invention is frequently described herein as pertaining to a microelectronically-machined relay for use in electrical or electronic systems. It should be appreciated that many other manufacturing techniques could be used to create the relays described herein, and that the techniques described herein could be used in mechanical relays, optical relays or any other switching device. Further, the techniques would be suitable for application in electrical systems, optical systems, consumer electronics, industrial electronics, wireless systems, space applications, or any other application.

The terms, chip, integrated circuit, monolithic device, semiconductor device, and microelectronic device, are often used interchangeably in this field. The present invention is applicable to all the above as they are generally understood in the field.

The terms metal line, interconnect line, trace, wire, conductor, signal path and signaling medium are all related. The related terms listed above, are generally interchangeable, and appear in order from specific to general. In this field, metal lines are sometimes referred to as traces, wires, lines, interconnect or simply metal. Metal lines, generally aluminum (Al), copper (Cu) or an alloy of Al and Cu, are conductors that provide signal paths for coupling or interconnecting, electrical circuitry. Conductors other than metal are available in microelectronic devices. Materials such as doped polysilicon, doped single-crystal silicon (often referred to simply as diffusion, regardless of whether such doping is achieved by thermal diffusion or ion implantation), titanium (Ti), molybdenum (Mo), and refractory metal suicides are examples of other conductors.

The terms contact and via, both refer to structures for electrical connection of conductors from different interconnect levels. These terms are sometimes used in the art to describe both an opening in an insulator in which the structure will be completed, and the completed structure itself. For purposes of this disclosure contact and via refer to the completed structure.

The term vertical, as used herein, means substantially orthogonal to the surface of a substrate. Moreover, it should be understood that the spatial descriptions (e.g., "above", "below", "up", "down", "top", "bottom", etc.) made herein are for purposes of illustration only, and that practical latching relays can be spatially arranged in any orientation or manner.

The above-described micro-magnetic latching switch is further described in international patent publications WO0157899 (titled Electronically Switching Latching Micro-magnetic Relay And Method of Operating Same), and WO0184211 (titled Electronically Micro-magnetic latching switches and Method of Operating Same), to Shen et al. These patent publications provide a thorough background on micro-magnetic latching switches and are incorporated herein by reference in their entirety. Moreover, the details of the switches disclosed in WO0157899 and WO0184211 are applicable to implement the switch embodiments of the present invention as described below.

Overview of a Latching Switch

Figure 1B:
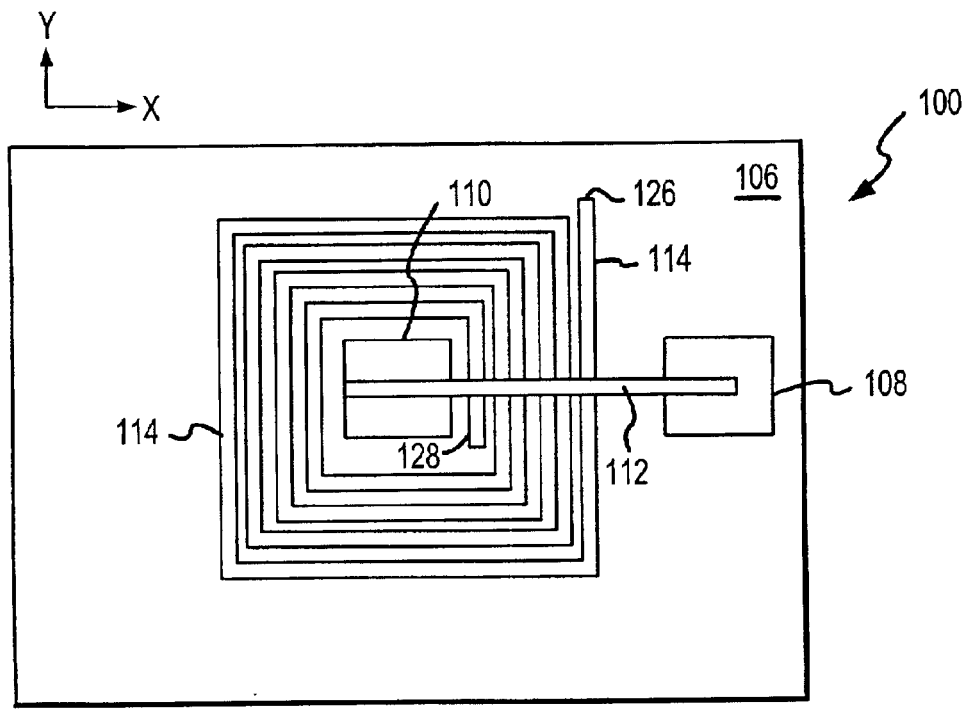

FIGS. 1A and 1B show side and top views, respectively, of a latching switch. The terms switch and device are used herein interchangeably to described the structure of the present invention. With reference to FIGS. 1A and 1B, an exemplary latching relay 100 suitably includes a magnet 102, a substrate 104, an insulating layer 106 housing a conductor 114, a contact 108 and a cantilever (moveable element) 112 positioned or supported above substrate by a staging layer 110.

Magnet 102 is any type of magnet such as a permanent magnet, an electromagnet, or any other type of magnet capable of generating a magnetic field $H_0$ 134, as described more fully below. By way of example and not limitation, the magnet 102 can be a model 59-P09213T001 magnet available from the Dexter Magnetic Technologies corporation of Fremont, Calif., although of course other types of magnets could be used. Magnetic field 134 can be generated in any manner and with any magnitude, such as from about 1 Oersted to $10^4$ Oersted or more. The strength of the field depends on the force required to hold the cantilever in a given state, and thus is implementation dependent. In the exemplary embodiment shown in FIG. 1, magnetic field $H_0$ 134 can be generated approximately parallel to the Z axis and with a magnitude on the order of about 370 Oersted, although other embodiments will use varying orientations and magnitudes for magnetic field 134. In various embodiments, a single magnet 102 can be used in conjunction with a number of relays 100 sharing a common substrate 104.

Substrate 104 is formed of any type of substrate material such as silicon, gallium arsenide, glass, plastic, metal or any other substrate material. In various embodiments, substrate 104 can be coated with an insulating material (such as an oxide) and planarized or otherwise made flat. In various embodiments, a number of latching relays 100 can share a single substrate 104. Alternatively, other devices (such as transistors, diodes, or other electronic devices) could be formed upon substrate 104 along with one or more relays 100 using, for example, conventional integrated circuit manufacturing techniques. Alternatively, magnet 102 could be used as a substrate and the additional components discussed below could be formed directly on magnet 102. In such embodiments, a separate substrate 104 may not be required.

Insulating layer 106 is formed of any material such as oxide or another insulator such as a thin-film insulator. In an exemplary embodiment, insulating layer is formed of Probimide 7510 material. Insulating layer 106 suitably houses conductor 114. Conductor 114 is shown in FIGS. 1A and 1B to be a single conductor having two ends 126 and 128 arranged in a coil pattern. Alternate embodiments of conductor 114 use single or multiple conducting segments arranged in any suitable pattern such as a meander pattern, a serpentine pattern, a random pattern, or any other pattern. Conductor 114 is formed of any material capable of conducting electricity such as gold, silver, copper, aluminum, metal or the like. As conductor 114 conducts electricity, a magnetic field is generated around conductor 114 as discussed more fully below.

Cantilever (moveable element) 112 is any armature, extension, outcropping or member that is capable of being affected by magnetic force. In the embodiment shown in FIG. 1A, cantilever 112 suitably includes a magnetic layer 118 and a conducting layer 120. Magnetic layer 118 can be formulated of permalloy (such as NiFe alloy) or any other magnetically sensitive material. Conducting layer 120 can be formulated of gold, silver, copper, aluminum, metal or any other conducting material. In various embodiments, cantilever 112 exhibits two states corresponding to whether relay 100 is "open" or "closed", as described more fully below. In many embodiments, relay 100 is said to be "closed" when a conducting layer 120, connects staging layer 110 to contact 108. Conversely, the relay may be said to be "open" when cantilever 112 is not in electrical contact with contact 108. Because cantilever 112 can physically move in and out of contact with contact 108, various embodiments of cantilever 112 will be made flexible so that cantilever 112 can bend as appropriate. Flexibility can be created by varying the thickness of the cantilever (or its various component layers), by patterning or otherwise making holes or cuts in the cantilever, or by using increasingly flexible materials.

Figure 12:
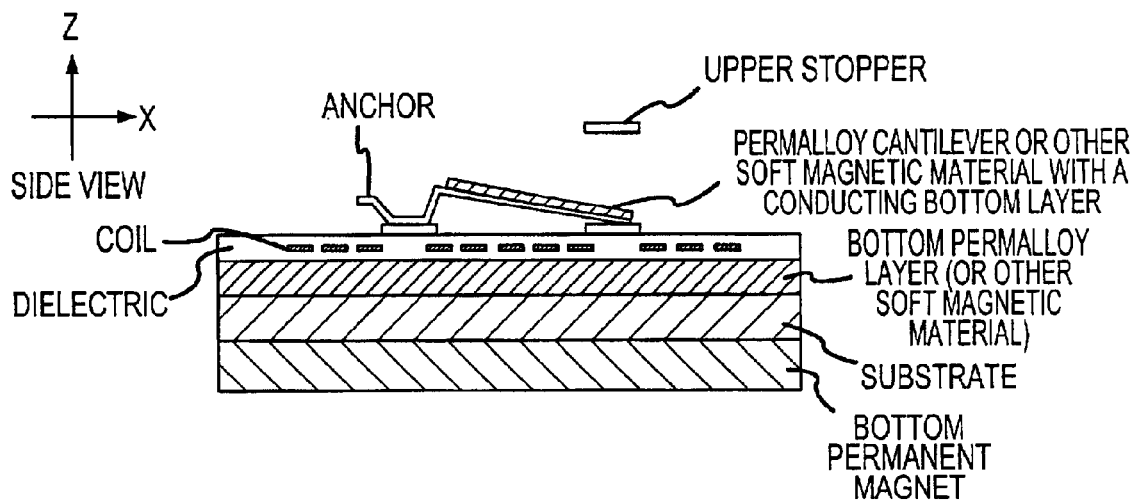
FIGS. 12 and 17 show a one-end-fixed (or spring board) type micro-magnetic latching switch according to the present invention.

Alternatively, cantilever 112 can be made into a "hinged" arrangement (such as that described below in conjunction with FIG. 12). Although of course the dimensions of cantilever 112 can vary dramatically from implementation to implementation, an exemplary cantilever 112 suitable for use in a micro-magnetic relay 100 can be on the order of 10–1000 microns in length, 1–40 microns in thickness, and 2–600 microns in width. For example, an exemplary cantilever in accordance with the embodiment shown in FIG. 1 can have dimensions of about 600 microns×10 microns×50 microns, or 1000 microns×600 microns×25 microns, or any other suitable dimensions.

Contact 108 and staging layer 110 are placed on insulating layer 106, as appropriate. In various embodiments, staging layer 110 supports cantilever 112 above insulating layer 106, creating a gap 116 that can be vacuum or can become filled with air or another gas or liquid such as oil. Although the size of gap 116 varies widely with different implementations, an exemplary gap 116 can be on the order of 1–100 microns, such as about 20 microns, Contact 108 can receive cantilever 112 when relay 100 is in a closed state, as described below, Contact 108 and staging layer 110 can be formed of any conducting material such as gold, gold alloy, silver, copper, aluminum, metal or the like. In various embodiments, contact 108 and staging layer 110 are formed of similar conducting materials, and the relay is considered to be "closed" when cantilever 112 completes a circuit between staging layer 110 and contact 108. In certain embodiments wherein cantilever 112 does not conduct electricity, staging layer 110 can be formulated of non-conducting material such as Probimide material, oxide, or any other material. Additionally, alternate embodiments may not require staging layer 110 if cantilever 112 is otherwise supported above insulating layer 106.

Principle of Operation of a Micro-magnetic Latching Switch

When it is in the "down" position, the cantilever makes electrical contact with the bottom conductor, and the switch is "on"(also called the "closed" state). When the contact end is "up", the switch is "off"(also called the "open" state). These two stable states produce the switching function by the moveable cantilever element. The permanent magnet holds the cantilever in either the "up" or the "down" position after switching, making the device a latching relay. A current is passed through the coil (e.g., the coil is energized) only during a brief (temporary) period of time to transition between the two states.

(i) Method to Produce Bi-stability

Figure 2:
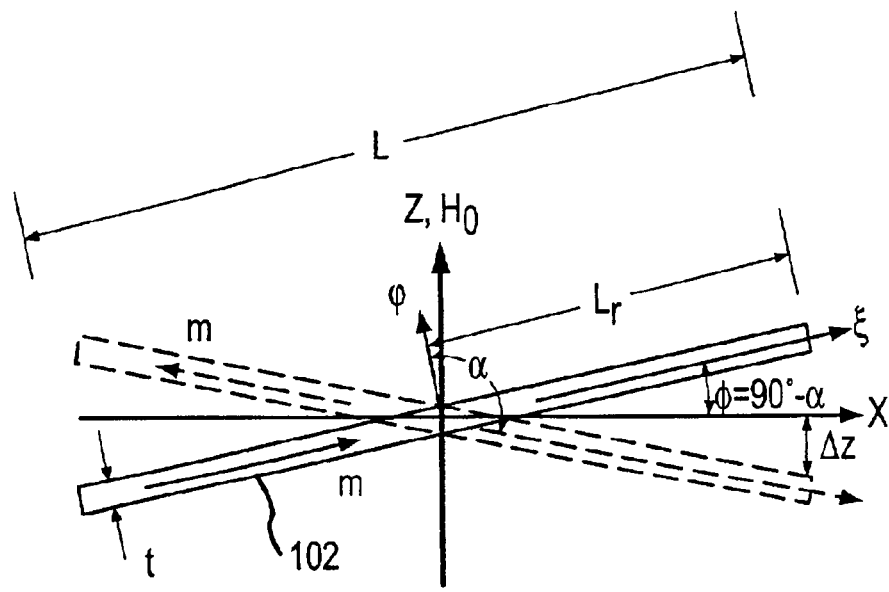
FIG. 2 illustrates the principle by which bi-stability is produced.

The principle by which bi-stability is produced is illustrated with reference to FIG. 2. When the length L of a permalloy cantilever 102 is much larger than its thickness t and width (w, not shown), the direction along its long axis L becomes the preferred direction for magnetization (also called the "easy axis"). When a major central portion of the cantilever is placed in a uniform permanent magnetic field, a torque is exerted on the cantilever. The torque can be either clockwise or counterclockwise, depending on the initial orientation of the cantilever with respect to the magnetic field. When the angle ($\alpha$) between the cantilever axis ($\xi$) and the external field ($H_0$) is smaller than 90°, the torque is counterclockwise; and when a is larger than 90°, the torque is clockwise. The bi-directional torque arises because of the bi-directional magnetization (i.e., a magnetization vector "m" points one direction or the other direction, as shown in FIG. 2) of the cantilever (m points from left to right when $\alpha<90°$, and from right to left when $\alpha>90°$). Due to the torque, the cantilever tends to align with the external magnetic field ($H_0$). However, when a mechanical force (such as the elastic torque of the cantilever, a physical stopper, etc.) preempts to the total realignment with $H_0$, two stable positions ("up" and "down") are available, which forms the basis of latching in the switch.

(ii) Electrical Switching

If the bi-directional magnetization along the easy axis of the cantilever arising from $H_0$ can be momentarily reversed by applying a second magnetic field to overcome the influence of ($H_0$), then it is possible to achieve a switchable latching relay. This scenario is realized by situating a planar coil under or over the cantilever to produce the required temporary switching field. The planar coil geometry was chosen because it is relatively simple to fabricate, though other structures (such as a wrap-around, three dimensional type) are also possible. The magnetic field (Hcoil) lines generated by a short current pulse loop around the coil. It is mainly the $\xi$-component (along the cantilever, see FIG. 2) of this field that is used to reorient the magnetization (magnetization vector "m") in the cantilever. The direction of the coil current determines whether a positive or a negative $\xi$-field component is generated. Plural coils can be used. After switching, the permanent magnetic field holds the cantilever in this state until the next switching event is encountered. Since the $\xi$-component ofthe coil-generated field (Hcoil-$\xi$) only needs to be momentarily larger than the $\xi$-component [$H_0\xi \sim H_0 \cos(\alpha)=H_0 \sin((\phi), \alpha=90°-\phi$] of the permanent magnetic field and $\phi$ is typically very small (e.g., $\phi \leq 5°$), switching current and power can be very low, which is an important consideration in micro relay design.

The operation principle can be summarized as follows: A permalloy cantilever in a uniform (in practice, the field can be just approximately uniform) magnetic field can have a clockwise or a counterclockwise torque depending on the angle between its long axis (easy axis, L) and the field. Two bi-stable states are possible when other forces can balance die torque. A coil can generate a momentary magnetic field to switch the orientation of magnetization (vector m) along the cantilever and thus switch the cantilever between the two states.

Relaxed Alignment of Magnets

To address the issue of relaxing the magnet alignment requirement, the inventors have developed a technique to create perpendicular magnetic fields in a relatively large region around the cantilever. The invention is based on the fact that the magnetic field lines in a low permeability media (e.g., air) are basically perpendicular to the surface of a very high permeability material (e.g., materials that are easily magnetized, such as permalloy). When the cantilever is placed in proximity to such a surface and the cantilever's horizontal plane is parallel to the surface of the high permeability material, the above stated objectives can be at least partially achieved. The generic scheme is described below, followed by illustrative embodiments of the invention.

The boundary conditions for the magnetic flux density (B) and magnetic field (H) follow the following relationships:

$$B_2 \cdot n = B_1 \cdot n$$

$$B_2 \times n = (\mu_2/\mu_1) B_1 \times n$$

or $$H_2 \cdot n = (\mu_2/\mu_1) H_1 \cdot n$$

$$H_2 \times n = H_1 \times n$$

Figure 3:
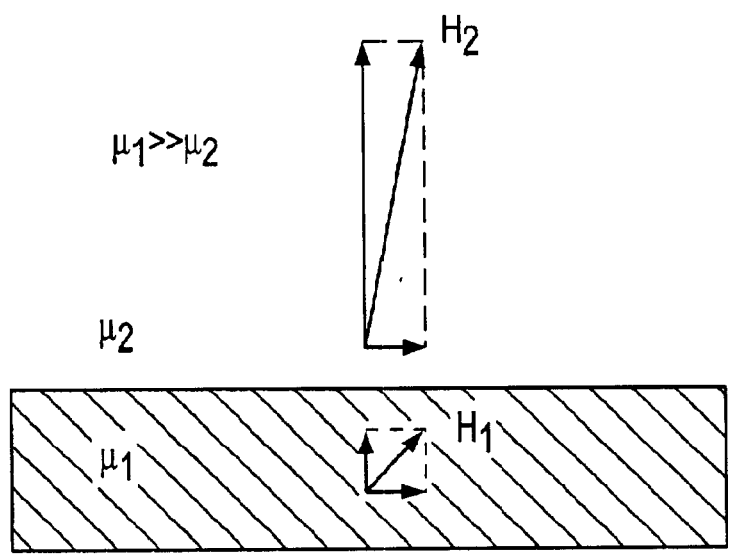
FIG. 3. illustrates the boundary conditions on the magnetic field (H) at a boundary between two materials with different permeability (m1>>m2).

If $\mu_1 \gg \mu_2$, the normal component of $H_2$ is much larger than the normal component of $H_1$, as shown in FIG. 3. In the limit $(\mu_1/\mu_1) \to \infty$, the magnetic field $H_2$ is normal to the boundary surface, independent of the direction of $H_1$ (barring the exceptional case of HI exactly parallel to the interface). If the second media is air ($\mu_2 = 1$), then $B_2 = \mu_0 H_2$, so that the flux lines $B_2$ will also be perpendicular to the surface. This property is used to produce magnetic fields that are perpendicular to the horizontal plane of the cantilever in a micro-magnetic latching switch and to relax the permanent magnet alignment requirements.

Figure 4A:
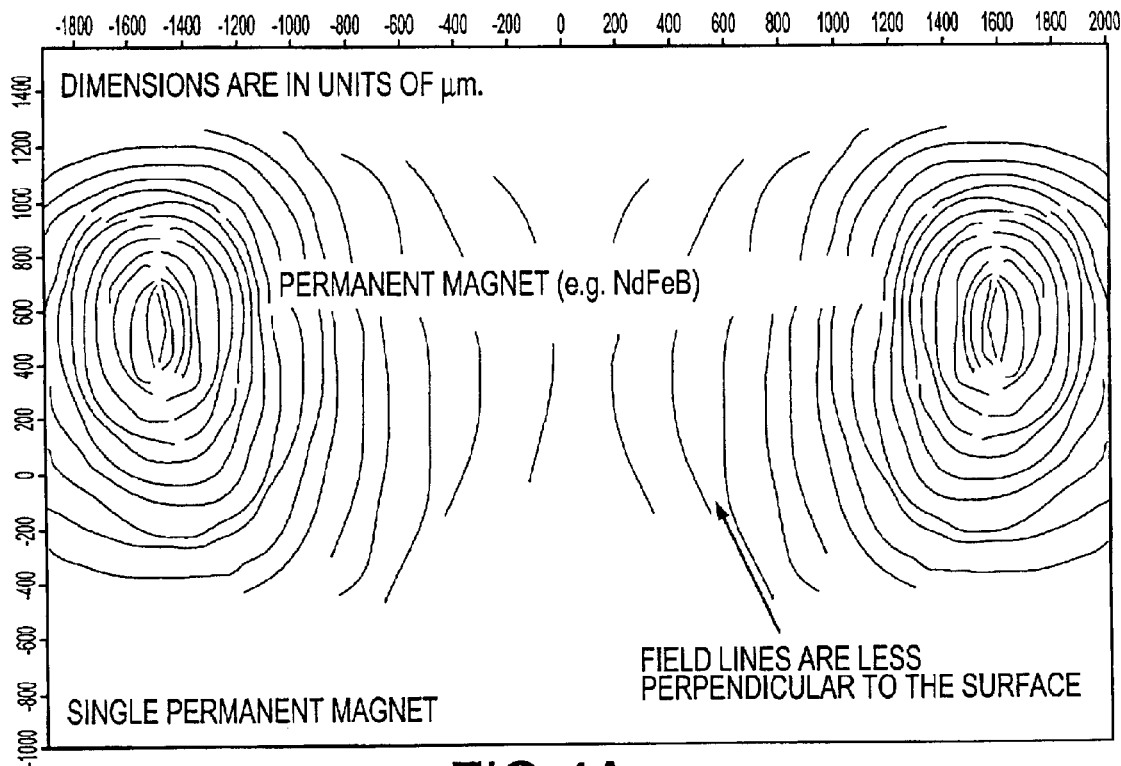
FIG. 4 shows the computer simulation of magnetic flux distributions, according to the present invention.
Figure 4B:
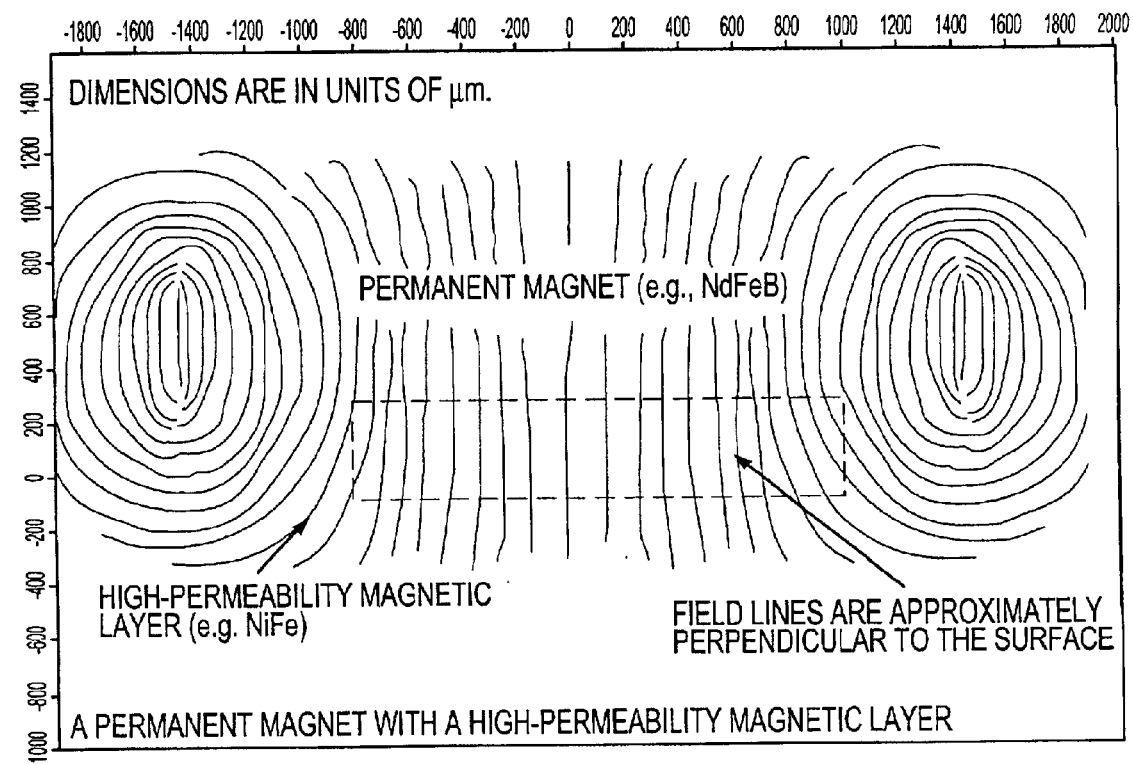

FIGS. 4A and 4B shows the computer simulation of magnetic flux (B) distributions. As can be seen, without the high-permeability magnetic layer (a), the flux lines are less perpendicular to the horizontal plane, resulting in a large horizontal (x) component. The magnetic flux lines are approximately perpendicular to the horizontal plane in a relatively large region when a high-permeability magnetic layer is introduced with its surface parallel to horizontal plane (b). The region indicated by the box with dashed lines will be the preferred location of the switch with the cantilever horizontal plane parallel to the horizontal axis (x).

Figure 5A:
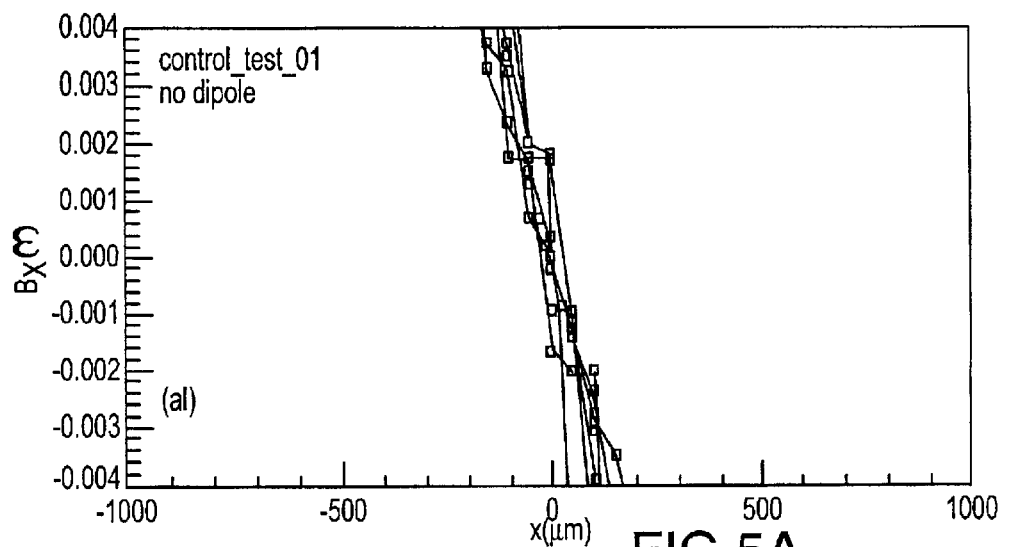
FIGS. 5A–C show extracted horizontal components (Bx) of the magnetic flux in FIG. 4.
Figure 5B:
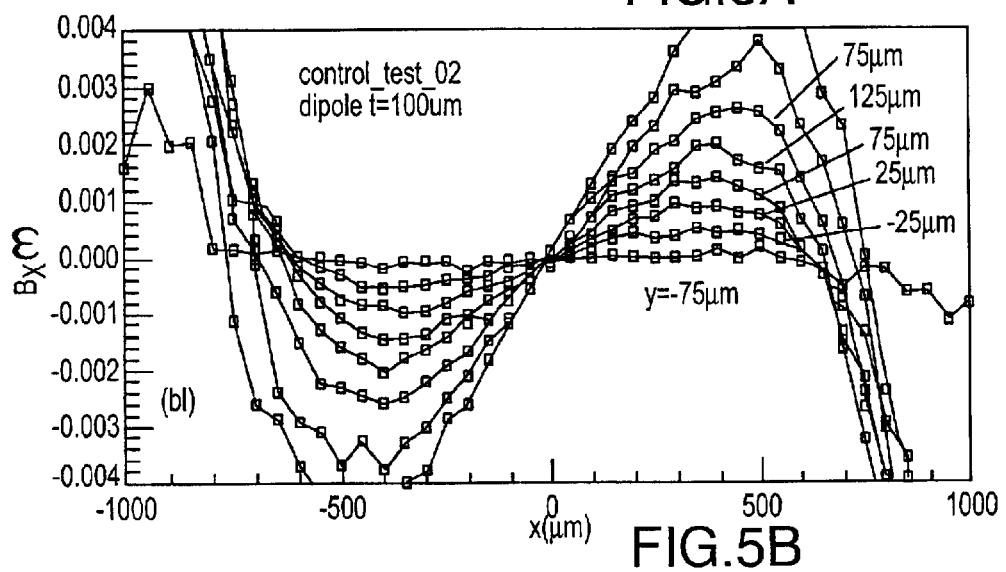
Figure 5C:
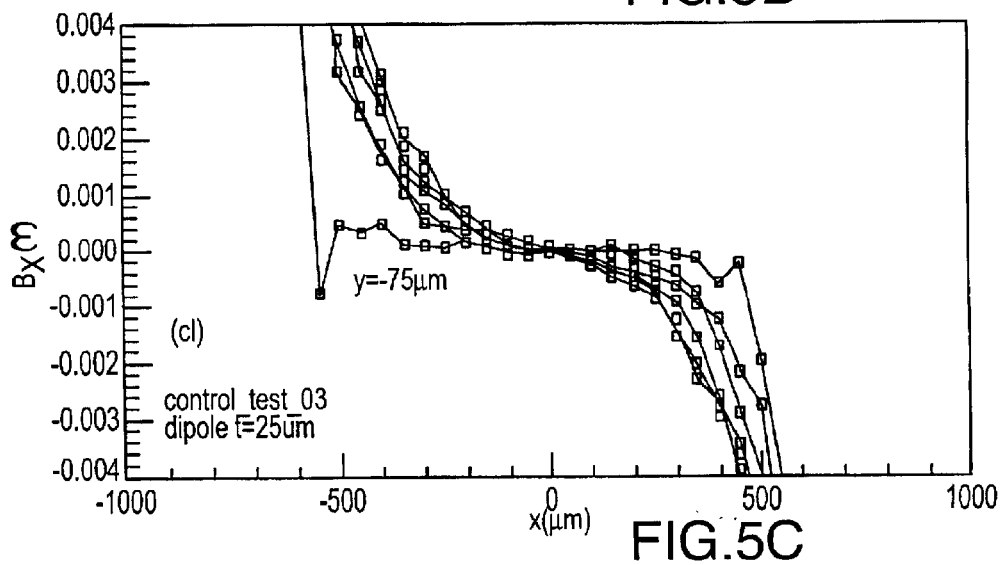

FIGS. 5A–C show the extracted horizontal components (Bx) of the magnetic flux along cut-lines at various heights (y=−75 mm, −25 mm, 25 mm . . . ). From the top to bottom (a1–b1–c1), the right hand figures correspond to case (a) single permanent magnet, (b) a permanent magnet with a high-permeability magnetic layer (thickness t=100 mm), and another case where the high-permeability magnetic layer thickness is t=25 mm. In (a1) without the high-permeability magnetic layer, we can see that Bx increases rapidly away from the center. In (b1), Bx is reduced from (a1) due to the use of the high-permeability magnetic layer. A thinner high-m layer (c1) is less effective as the thicker one (b1).

This property, that the magnetic field is normal to the boundary surface of a high-permeability material, and the placement of the cantilever (soft magnetic) with its horizontal plane parallel to the surface of the high-permeability material, can be used in many different configurations to relax the permanent magnet alignment requirement.

Figure 6A:
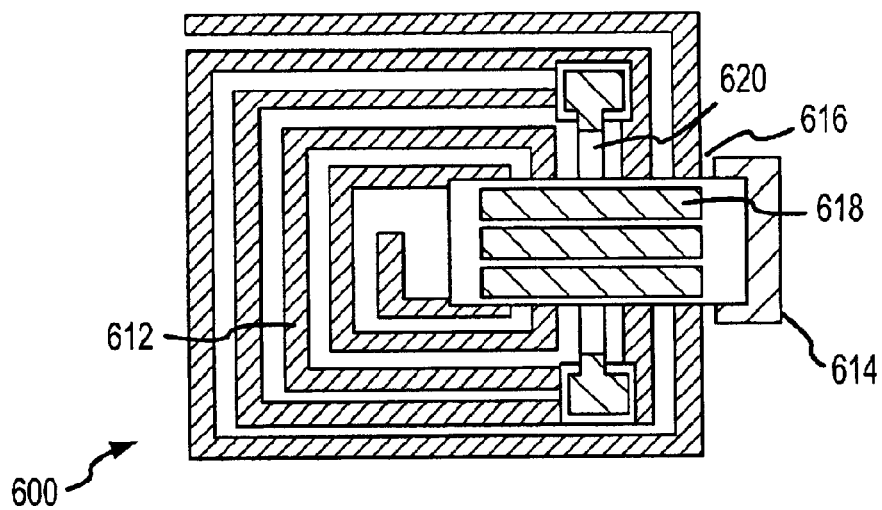
FIGS. 6A and 6B show a top view and a side view, respectively, of a micro-magnetic latching switch 600 with relaxed permanent magnet alignment according to an aspect of the present invention.
Figure 6B:
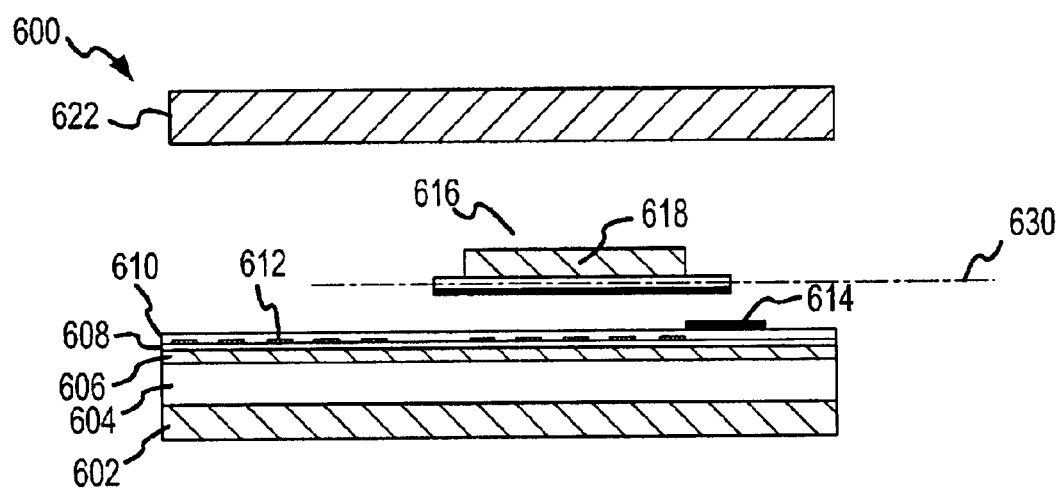

FIGS. 6A and 6B show a top view and a side view, respectively, of a micro-magnetic latching switch 600 with relaxed permanent magnet alignment according to an aspect the present invention. In this embodiment, two high-permeability magnetic layers are used to help the magnetic alignment in making the micro-magnetic latching switch. The switch comprises the following basic elements: first high-permeability magnetic layer 602, substrate 604, second high-permeability magnetic layer 606, dielectric layers 608 and 610, a spiral coil 612, bottom conductor 614, cantilever assembly 616 (with a least a soft magnetic layer 618 and other conducting and/or supporting torsion spring 620), and a top permanent magnetic layer 622 with a vertical magnetization orientation. Preferably, the surfaces of the permanent magnet 622 and the high-permeability magnetic layers 602 and 606 are all parallel to the horizontal plane 630 of the cantilever 616 so that the horizontal component of the magnetic field produced by 622 is greatly reduced near cantilever 616. Alternatively, a single soft magnetic layer (602 or 606) can be used.

Figure 7:
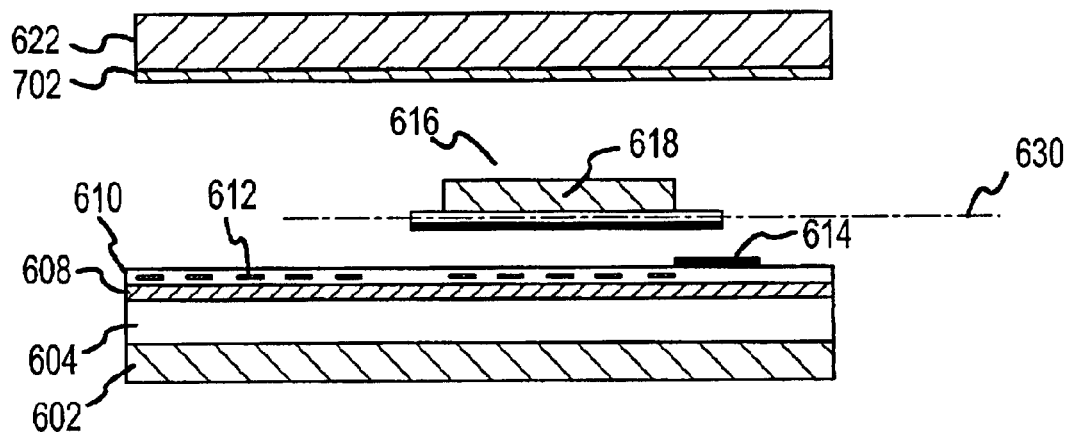
FIGS. 7 and 8 show further embodiments of the micro-magnetic latching switch according to the present invention.

FIG. 7 shows another embodiment of the micro-magnetic latching switch. In this embodiment, two high-permeability magnetic layers are used to help the magnetic alignment in making the micro-magnetic latching switch. The switch comprises the similar basic elements as shown in FIG. 6. What differs this embodiment from that of FIG. 6 is that the second high-permeability magnetic layer 702 is placed just below the top permanent magnet 622. Again, preferably, the surfaces of the permanent magnet 622 and the high-permeability magnetic layers 602 and 702 are all parallel to the horizontal plane 630 of the cantilever 616 so that the horizontal component of the magnetic field produced by 622 is greatly reduced near cantilever 616.

Figure 8:
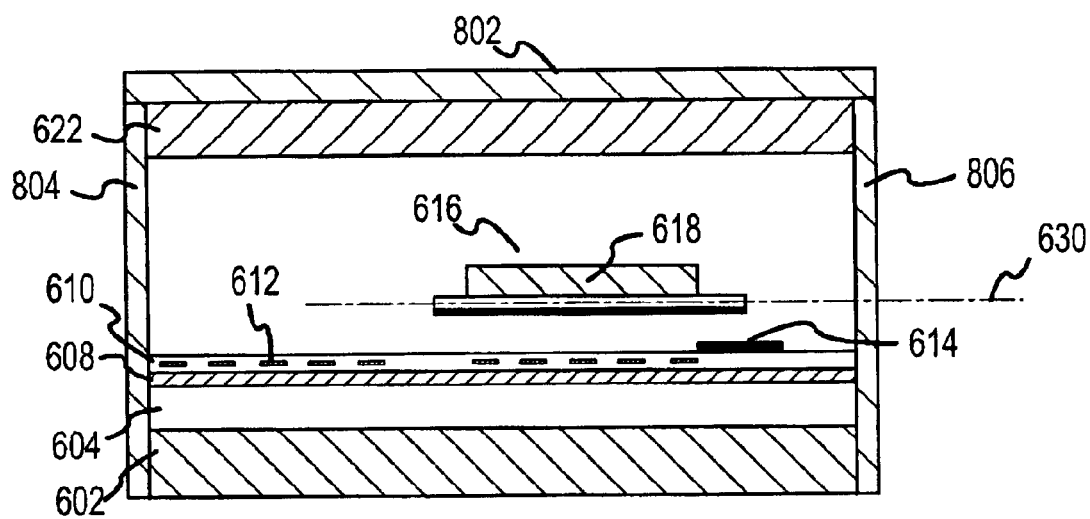

FIG. 8 shows another embodiment of the micro-magnetic latching switch. In this embodiment, several high-permeability magnetic layers 602, 802, 804 and 806 are placed around the permanent magnet 622 and the cantilever switch in a package to form a magnetic loop. The bottom high-permeability magnetic layer 602 helps to reduce the horizontal field component near cantilever 616, and the layers 802, 804 and 806 screens the external field and improve the internal magnetic field strength.

The above cases are provided as examples to illustrate the use of high-permeability magnetic materials in combination with permanent magnets to produce magnetic fields perpendicular to the horizontal plane of the cantilever of the micro-magnetic latching switches. Different variations (multiple layers, different placements, etc.) can be designed based on this principle to accomplish the goal of relaxing the alignment of the permanent magnet with the cantilever to make the switch bi-stable (latching) and easy (low current) to switch from one state to the other.

In another embodiment pf the present invention, the switch system comprises micro-magnetic cantilevers, electromagnets (S-shape or single-line coils), permanent magnetic and soft magnetic layer in parallel to provide an approximate uniform magnetic field distribution, single-pole double-throw (SPDT) schemes, and transmission line structures suitable for radio frequency signal transmissions.

Figure 9A:
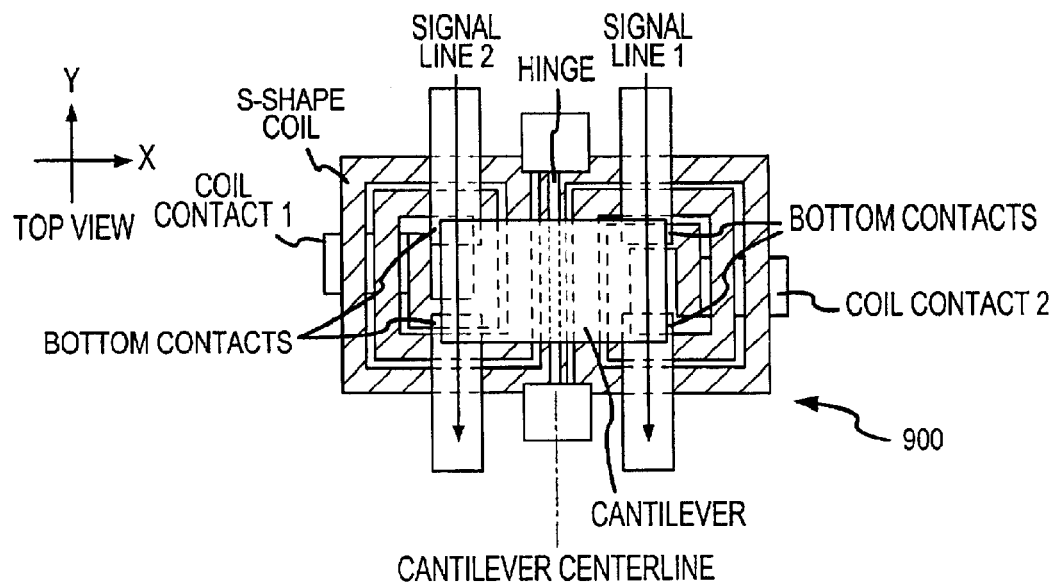
FIGS. 9A and 9B show a top view and a side view, respectively, of a micro-magnetic latching switch with additional features of the present invention.
Figure 9B:
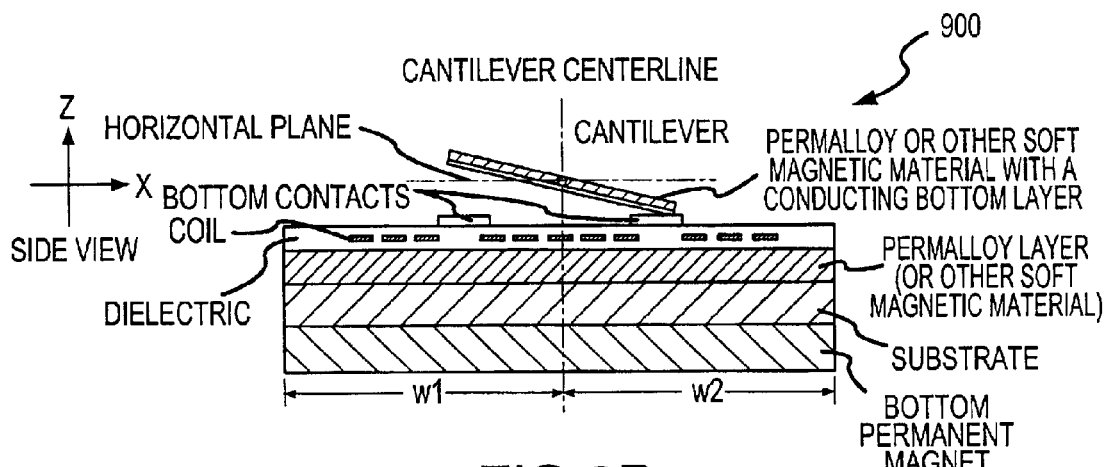

FIGS. 9A and 9B shows a top view and a side view, respectively, of a micro-magnetic latching switch with additional features of the present invention. The switch 900 comprises the following basic elements: a cantilever made of soft magnetic material (e.g. permalloy) and a conducting layer, cantilever-supporting hinges (torsion spring), bottom contacts that serve as the signal lines, an "S-shape" planar conducting coil, a permalloy layer (or other soft magnetic material) on the substrate (which is normalloy silicon, GaAs, glass, etc), and a bottom permanent magnet (e.g., Neodymium) attached to the bottom of the substrate. The magnet can be placed or fabricated directly on the substrate. The magnetization orientation of the magnet is either along +Z or along −Z. Due to the soft magnetic material's nature of high permeability, the magnetic field near the permalloy top surface is self-aligned parallel to z-axis (or approximately perpendicular to the permalloy layer surface). This self-aligned field is needed for holding the cantilever in either on or off state. The whole device is housed in a suitable package (not shown) with proper sealing and electrical contact leads.

For the best performance, the cantilever centerline (which may not be the same as the hinge line) should be located approximately near the center of the magnet, i.e., the two distances from the edge (w1 and w2) are approximately equal. However, the cantilever centerline can also be located away from the center of the magnets and the device will still be functional. The S-shape coil produces the switching magnetic field to switch the cantilever from one state to the other by applying positive or negative current pulses into the coil. In the figure, the effective coil turn number under the cantilever is 5. However, the coil turn number n can be any arbitrary positive integer number (1<n <∞). When the turn number is one, it means there is just a single switching metal line under the cantilever. This is very useful design when the device size is scaled down. In addition, multilayer coil can also be used to strength the switching capability. This can be done by adding the successive coil layers on top of the other layer(s). Coil layers can be spaced by the in-between insulator and connected through the conducting vias.

The permanent magnetic field holds (latches) the cantilever to either state. When the cantilever toggles to the right, the cantilever's bottom conductor (e.g., Au) touches the bottom contacts and connects the signal line 1. In this case, the signal line 2 is disconnected. On the other hand, when the cantilever toggles to the left, the signal line 2 is connected and signal line 1 is disconnected. It forms a SPDT latching switch. Although in the figure, the widths of the magnet and permalloy layer on substrate are same, in reality, they can be different. The width of the magnet can either be larger or smaller than the width of permalloy layer.

Figure 10:
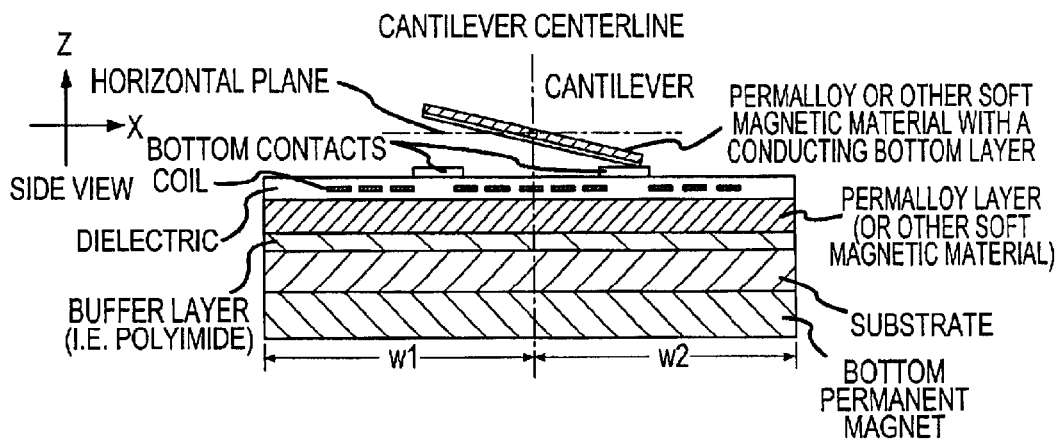
FIG. 10 shows micro-magnetic latching switch with a buffer layer according to the present invention.

Other variations are possible, for example, between the permalloy (or soft magnetic layer) and the substrate, a buffer layer (e.g., an organic material such as a polyamide like Durimide 7320, SU-8 resist, etc.) can be placed to minimize the stress problem in the permalloy layer. This is shown in FIG. 10. It is found that the buffer layer is very useful when the permalloy is thick (i.e., around 10 microns or thicker), which also means stress would be relatively high. Without the buffer layer, in some cases, the high stress could bend the substrate wafer significantly or even break the substrate.

Figure 11:
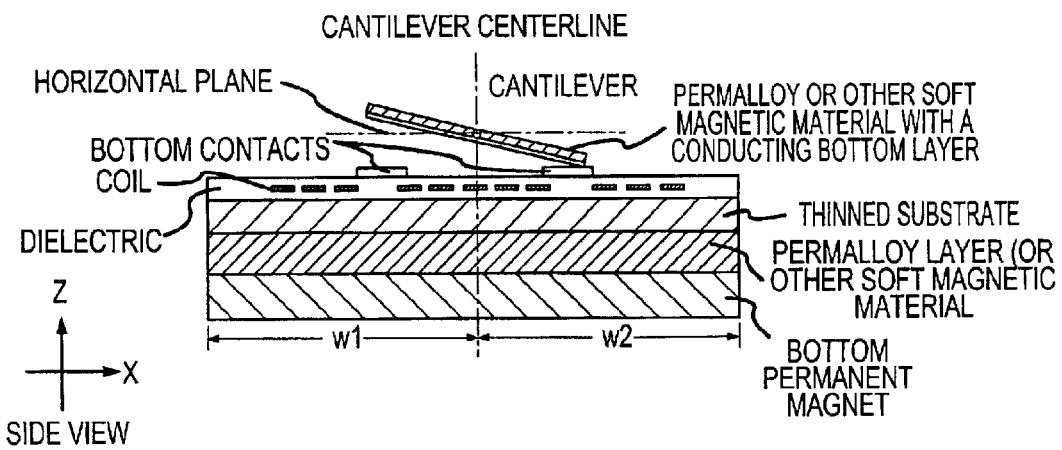
FIG. 11 shows a micro-magnetic latching switch with a permalloy placed under the thinned substrate according to the present invention.

Another variation is the permalloy (and magnet) can be place under the thinned substrate in the packaging or assembling process, instead of being processed directly on the substrate. This is shown in FIG. 11.

Yet another variation is that the cantilever may not necessarily be flexure hinged type. It can also be one-end-fixed (or spring board) type as shown in FIG. 12. An upper stopper may or may not be needed depending on the design of mechanics. Certainly, the variations of above mentioned buffer layer and permalloy layer placement also apply for this structure.

There is another variation, in which the permally layer can be coated or covered with other non-magnetic metals (i.e. gold, copper, aluminum, silver, etc.) either on surface facing the coil and cantilever or on its both top and bottom surface. The reason to coat permalloy layer with another non-magnetic metal is to prevent the interaction between the RF signal and the permalloy layer, if the switch is used for RF applications. In another word, the coated metal can shield the RF signals. This variation is illustrated in FIG. 19, described below.

According to another embodiment of the present invention, plural permanent magnets are used to relax alignment constraints.

Figure 13A:
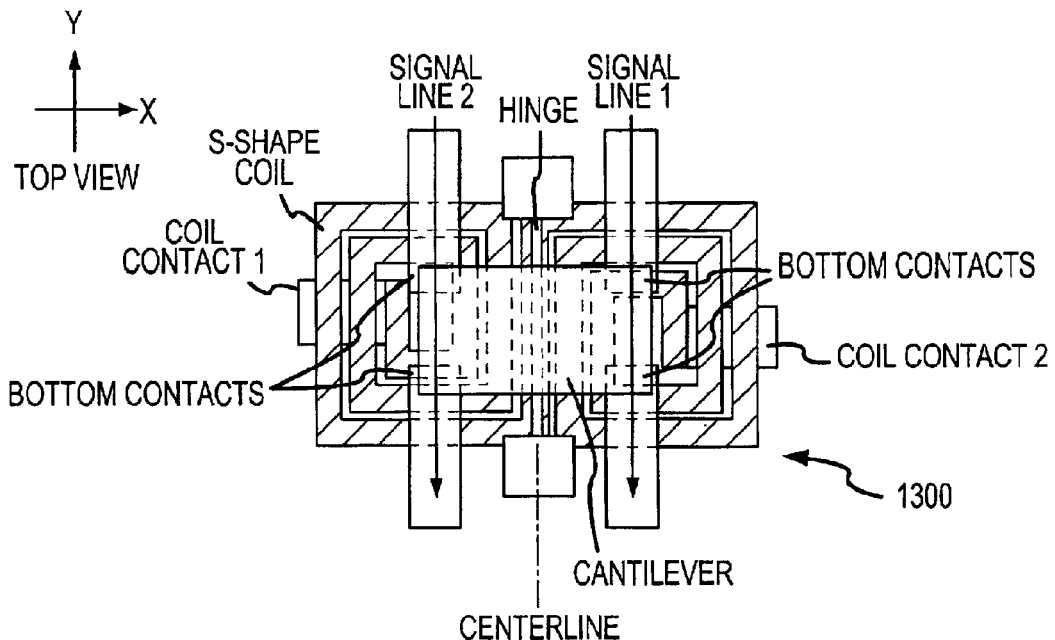
FIGS. 13A and 13B show a top view and side view, respectively, of a micro-magnetic latching switch 1300 with two permanent magnets according to the present invention.
Figure 13B:
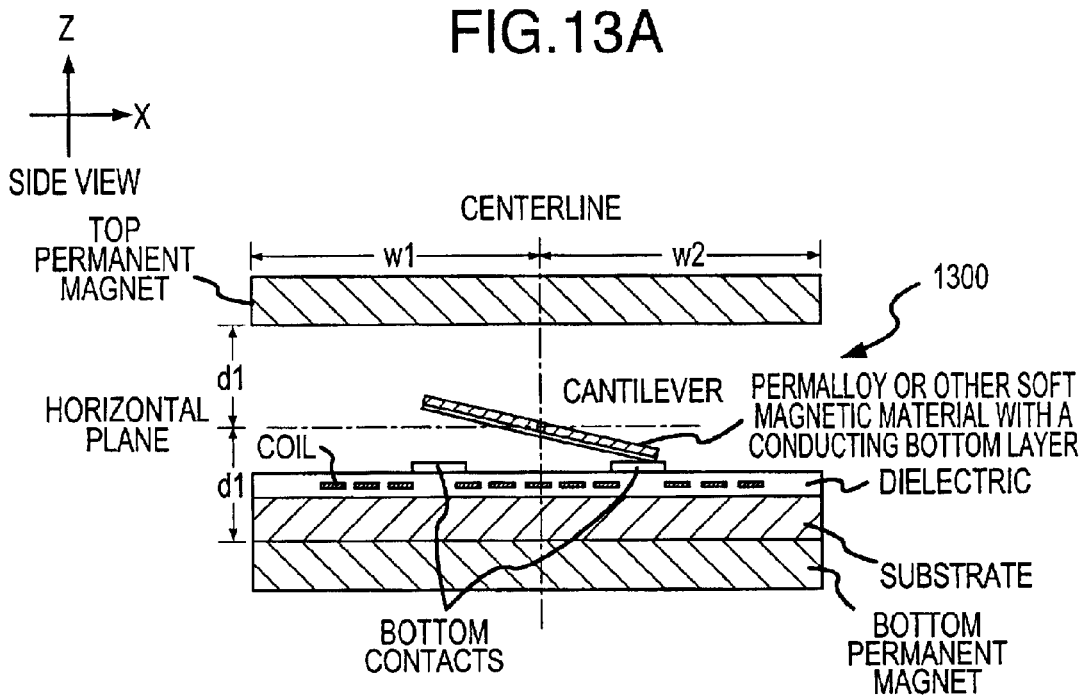

FIGS. 13A and 13B show a top view and side view, respectively, of a micro-magnetic latching switch 1300 with two permanent magnets. The switch 1300 comprises the following basic elements (as described above): a cantilever made of soft magnetic material (e.g. permalloy) and a conducting layer, cantilever-supporting hinges (torsion spring), bottom contacts that serve as the signal lines, an S-shape planar conducting coil, a substrate, and a top and a bottom permanent magnets (e.g., Neodymium) forming a magnetic dipole.

The magnetization orientations of the two magnets are the same (either along +Z or along −Z at the same time). The whole device is housed in a suitable package (not shown) with proper sealing and electrical contact leads. The two magnets provide a constant uniform magnetic field in the region where the cantilever resides. The two distances (d1 and d2) of the magnets from the cantilever horizontal plane are approximately equal if the two magnets are the same (thickness and magnetization, etc.). If the thicknesses are not equal, then the two distances (d1 and d2) should be designed so that most of the magnetic field lines are perpendicular to the horizontal plane. Also, the cantilever centerline (which may not be the same as the hinge line) should be located approximately near the center of the magnets, i.e., the two distances from the edge (w1 and w2) are approximately equal if the two magnets are the same.

The S-shape coil produces the switching magnetic field to switch the cantilever from one state to the other. The permanent magnetic field holds (latches) the cantilever to either state. When the cantilever toggles to the right, the cantilever's bottom conductor (e.g., Au) touches the bottom contacts and connects the signal line 1. In this case, the signal line 2 is disconnected. On the other hand, when the cantilever toggles to the left, the signal line 2 is connected and signal line 1 is disconnected. It forms a SPDT latching switch.

Figure 13C:
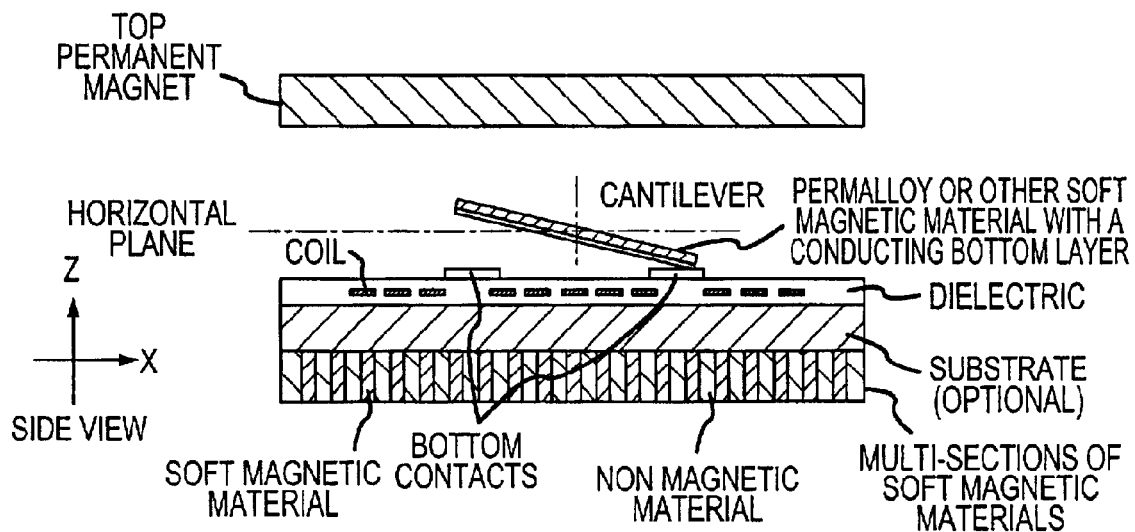
FIG. 13C shows an embodiment with a permanent magnet and a multi-sectional soft magnetic layer which form the magnetic dipole, according to the present invention.

FIG. 13C shows an embodiment with a permanent magnet and a multi-sectional soft magnetic layer form the magnetic dipole, which provides the uniform and perpendicular magnetic field to hold the states of the cantilever. A coil is also integrated for switching purposes as explained above. The soft magnetic layer is divided into multiple sections to increase the Z-component and decrease the X-component of the magnetic field by using preferential magnetization effects.

Figure 13D:
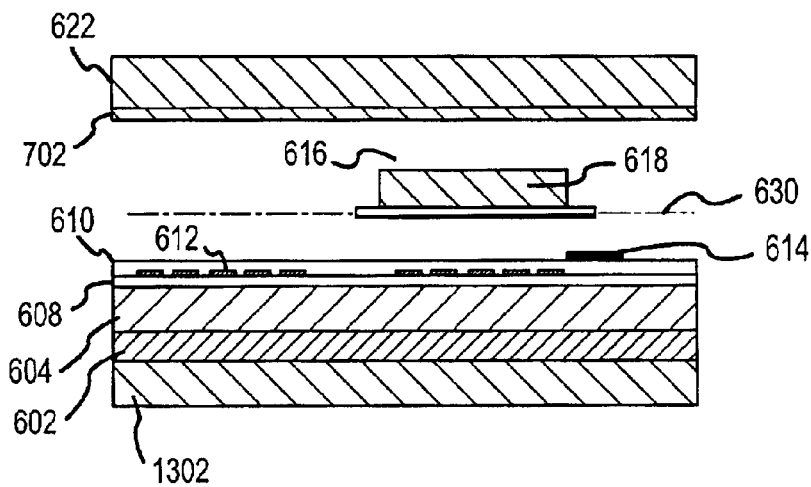
FIG. 13D shows an embodiment with two high-permeability magnetic layers and two permanent magnets according to the present invention.

FIG. 13D shows an embodiment with two high-permeability magnetic layers and two permanent magnets to simplify magnetic alignment. The switch comprises the following elements: first high-permeability magnetic layer 602, substrate 604, second high-permeability magnetic layer 702, dielectric layers 608 and 610, coil 712, bottom conductor 614, cantilever assembly 616 (with at least a soft magnetic layer 618), a top permanent magnetic layer 622 and a bottom permanent magnetic layer 1302 with the same vertical magnetization orientation. Preferably, the surfaces of the permanent magnets 622 and 1302, and the high-permeability magnetic layers 702 and 602 are all parallel to the horizontal plane 630 of the cantilever 616 so that the horizontal component of the magnetic field produced by 622 is greatly reduced near cantilever 616.

FIGS. 14A–C shows simulation results confirming the usefulness of the magnetic dipoles in producing the uniform magnetic fields. These figures show a comparison of the magnetic field distribution between a single permanent magnet (a) and a permanent magnet dipole (b). For illustrative purposes only, and not by way of limitation, the dimensions of each magnet (Alnico) are: width=2500 mm, thickness=1500 mm. The distance between the two magnets is 1000 mm in the dipole setup. The region where the magnetic field lines (arrows) are uniformly and distributed is larger in case (b) than in case (a). The micro-magnetic latching switch is preferably placed in the central region of the magnetic dipole. The long axis of the cantilever is preferably perpendicular to the magnetic field. The inventors have used Alnico as the magnetic material in this simulation. The result applies in general to other permanent magnets (e.g., Neodymium). In FIG. 14C, plots the horizontal (x) component of the magnetic field (B) along a horizontal line from the left of one magnet to its right. The line is located about 650 mm above the lower magnet (100 mm below the dipole center). These results further confirm that the magnetic field lines are more perpendicular in the dipole gap region (b) than the field lines in the corresponding region in the case of single magnet (a).

Figure 15A:
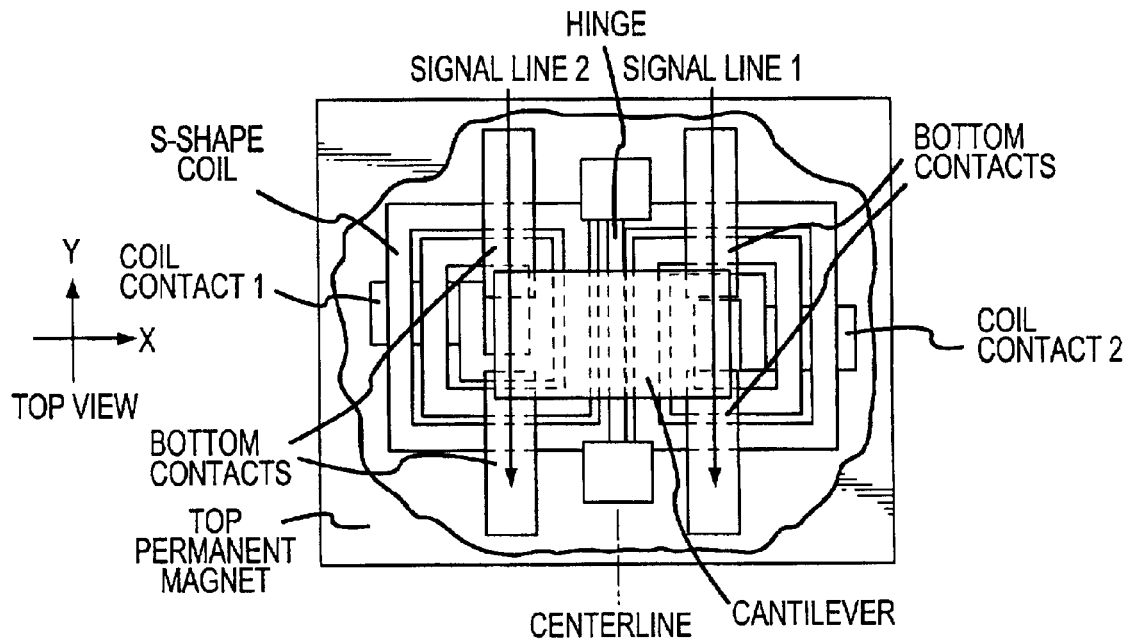
FIGS. 15A and 15B show a top view and a side view, respectively, of another micro-magnetic latching switch 1500 according to the present invention.
Figure 15B:
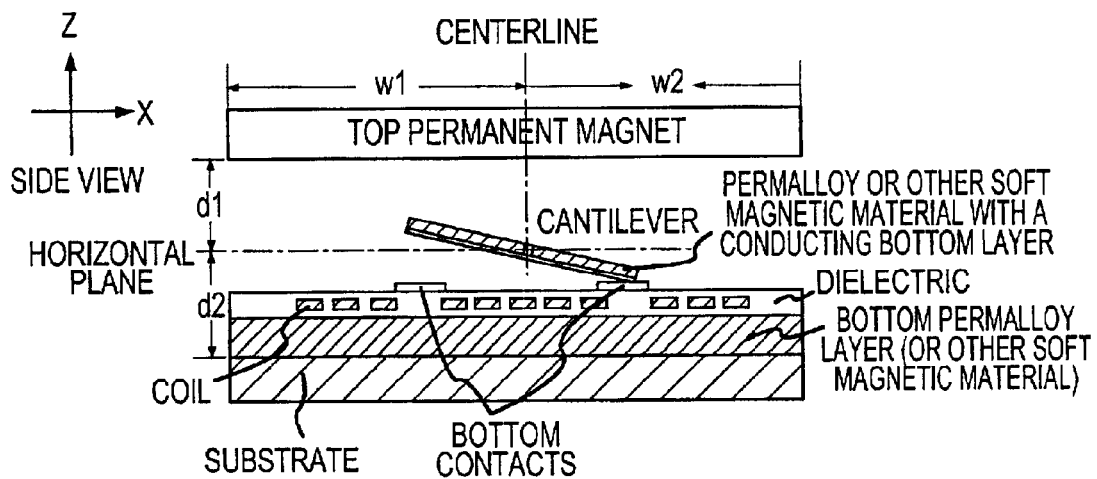

FIGS. 15A and 15B show a top view and a side view of another micro-magnetic latching switch 1500. The switch comprises the following basic elements: a cantilever made of soft magnetic material (e.g. permalloy) and a conducting layer, cantilever-supporting hinges (torsion springs), bottom contacts that serve as the signal lines, an S-shape planar conducting coil, a bottom permalloy layer (or other soft magnetic material) on the substrate, and a top permanent magnet (e.g., Neodymium). The bottom soft magnetic layer and the top permanent magnet form a magnetic dipole. The magnetization orientation of the magnet is either along +Z or along −Z. The magnetic dipole generates an approximate uniform field needed for holding the cantilever in either on or off state.

(The window through the top magnet is opened in the figure for clear illustration of the switch structures under the permanent magnet. In reality, the flat permanent magnet is solid and uniform throughout with no such window or vacancy part in the permanent magnet.)

The entire device is housed in a suitable package (not shown) with proper sealing and electrical contact leads. The two distances (d1 and d2) of the magnet and the permalloy layer from the cantilever horizontal plane, can be equal (d1=d2). They can also be different (d1±d2). Also, for the improved performance, the cantilever centerline (which may not be the same as the hinge line) can be located approximately near the center of the magnet, i.e., the two distances from the edge (w1 and w2) are approximately equal. However, the cantilever centerline can also be located away from the center of the magnets and the device will still be functional.

The S-shape coil produces the switching magnetic field to switch the cantilever from one state to the other by applying positive or negative current pulses into the coil. In the figure, the effective coil turn number under the cantilever is 5. However, the coil turn number n can be any arbitrary positive integer number (1<n <∞). When the turn number is one, it means there is just a single switching metal line under the cantilever. This is a very useful design when the device size is scaled down. The permanent magnetic field holds (latches) the cantilever to one of the two stable states. When the cantilever toggles to the right, the cantilever's bottom conductor (e.g., Au) touches the bottom contacts and connects the signal line 1. In this case, the signal line 2 is disconnected. On the other hand, when the cantilever toggles to the left, the signal line 2 is connected and signal line 1 is disconnected. It forms a SPDT latching switch. Although in the figure, the widths of the magnet and permalloy layer on the substrate are the same, in reality, they can be different. The width of the magnet can either be larger or smaller than the width of permalloy layer.

Other variations are possible, for example, one of the permanent magnet can be placed or fabricated directly on the substrate. The soft magnetic layer and coil can be placed on top of the cantilever. The setup is shown in FIG. 16.

Figure 16:
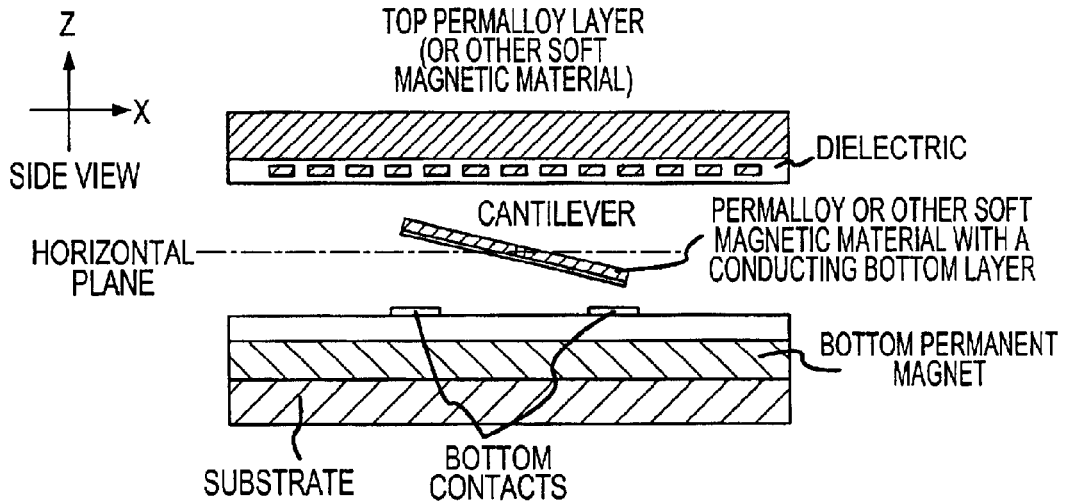
FIG. 16 is a side view of a different embodiment of a single-pole double-throw (SPDT) micro-magnetic latching switch with an "S-shape" coil according to the present invention.

FIG. 16 is a side view of a different embodiment of a single-pole double-throw (SPDT) micro-magnetic latching switch with an S-shape coil, having a top permalloy layer (or other soft magnetic material) and a bottom permanent magnet on substrate. The switch comprises the following basic elements: a cantilever made of soft magnetic material (e.g. permalloy) and a conducting layer, cantilever-supporting hinges (torsion spring), bottom contacts that serve as the signal lines, an S-shape planar conducting coil, a top permalloy layer (or other soft magnetic material) and bottom permanent magnet (e.g., Neodymium) on substrate forming a magnetic dipole. The magnetization orientation of the magnet is either along +Z or along −Z. The whole device is housed in a suitable package (not shown) with proper sealing and electrical contact leads. The S-shape coil produces the switching magnetic field to switch the cantilever from one state to the other. The permanent magnetic field holds (latches) the cantilever to either state.

Figure 17:
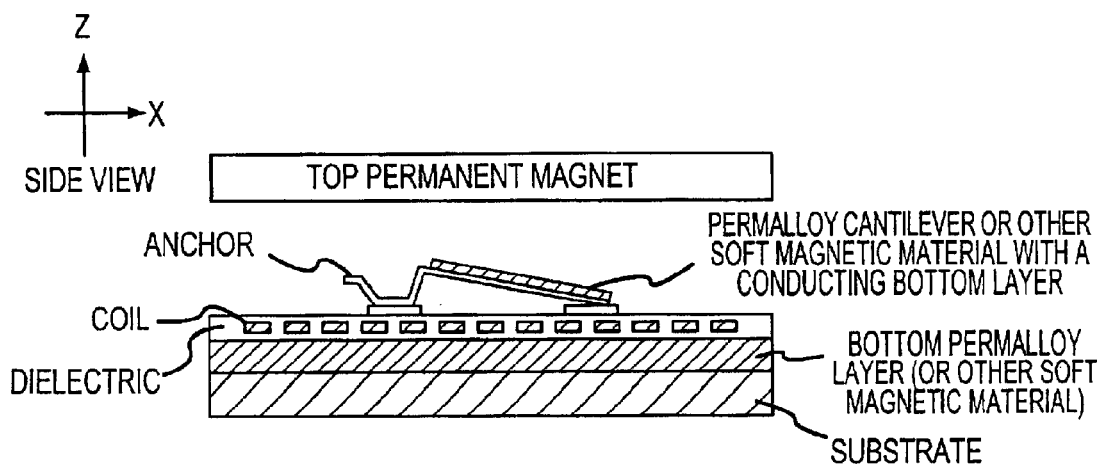

Alternatively, a one-end-fixed (or spring board) type switch is shown in FIG. 17. The bottom contact pad and permanent magnet bottom surface serve as stoppers in the switching actuation.

FIGS. 18A–D show an embodiment that incorporates transmission lines suitable for transmitting radio frequency (RF) signals. FIG. 18A is a top view, of switch 1800. FIG. 18B is a cross section view along the long axis of the cantilever at lines b–b'. FIG. 18C is a cross section view through the torsion spring of the cantilever at lines c–c'. FIG. 18D is a cross section view through the end, contact area of the cantilever at lines d–d'.

In this embodiment, the micro-magnetic latching switch consists of the following basic elements: bottom permanent magnet 1302, top permanent magnet 612, substrate 604, conductor line 1802 (i.e., single coil line), first signal line 1804, second signal line 1806, cantilever assembly 616 (bottom conducting layer 1810, first soft magnetic layer 1812, and second magnetic layer 618), and torsion spring 620. The two permanent magnets form a magnetic dipole which provides a uniform constant magnetic field in the region where cantilever 616 is located, typically near the center of the magnetic dipole. The magnetic flux lines are perpendicular to the surface of the cantilever. Proper spacers and packages support the magnets. Cantilever 616 is supported by torsion springs 620 from the two sides. In its static state, the cantilever either touches down on the right (closing the signal line 1806) or on the left (closing the signal line 1804). A current pulse through the single conducting line 1802 produces a temporary magnetic field which can realign the magnetization in the soft magnetic layer 681 and 1812 and 618 of the cantilever, and switches the cantilever between the two states. The switch is thus a latching single-pole double-throw switch. Areas 1820 are openings in the conducting line 1802 to isolate the signal lines from line 1802. Conducting lines 1830 and 1832 are ground lines.

In this embodiment, the signal lines 1804 and 1806, the ground lines 1830/1832, and the conducting line 1802 (acting as the single-line coil to switch the cantilever) are all fabricated in the same step(s) to simplify the fabrication process. The following general procedures can be used to fabricate the device. (1) A dielectric layer is deposited or grown on the substrate (optional depending on whether the substrate is insulating or not), (2) conducting layers (1804, 1806, 1802, 1830, 1832) are grown and patterned, (3) a sacrificial layer (e.g., photoresist, polyimide, etc.) is deposited and then openings are formed Other methods to fabricate this device will be apparent to persons skilled in the relevant art.

FIG. 19 shows another embodiment that incorporates transmission lines suitable for transmitting radio frequency (RF) signals. FIG. 19A is a top view, of switch 1900. FIG. 19B is a cross section view along the long axis of the cantilever at lines b–b'. FIG. 19C is a cross section view through the torsion spring of the cantilever at lines c–c'. FIG. 19D is a cross section view across support beam 1902 at lines d–d'.

In this embodiment, the micro-magnetic latching switch consists of the following basic elements: bottom permanent magnet 1302, top permanent magnet 612, substrate 604, conductor line 1802, first signal line 1804, second signal line 1806, cantilever assembly 616 (bottom conducting layer 1810, first soft magnetic layer 1812, and second magnetic layer 618 with multiple sections), torsion spring 620, and various supporting beams 1902. The two permanent magnets form a magnetic dipole which provides a uniform constant magnetic field in the region where cantilever 616 is located, typically near the center of the magnetic dipole. The magnetic flux lines are perpendicular to the surface of the cantilever. Proper spacers and packages support the magnets. Cantilever 616 is supported by torsion springs 620 from the two sides. In its static state, the cantilever either touches down on the right (closing the signal line 1804) or on the left (closing the signal line 1806). A current pulse through the single conducting line 1802 produces a temporary magnetic field which can realign the magnetization in the soft magnetic layer 1812 and 618 of the cantilever, and switches the cantilever between the two states. The switch is thus a latching single-pole double-throw switch. Optional conducting ground planes 1910 and 1912 can also be placed below and above the switch 616 to form co-planar wave guide structures.

Switch Array

Figure 20:
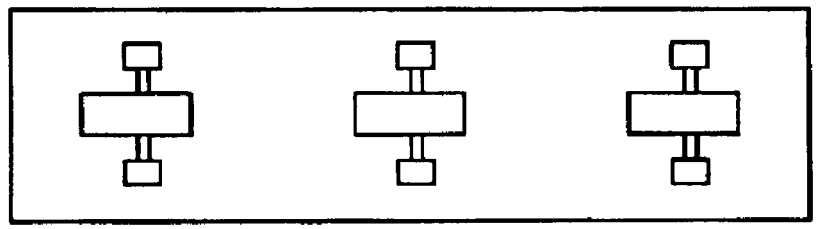
FIGS. 20–29 show various micro-magnetic latching switch array embodiments according to the present invention.
Figure 21:
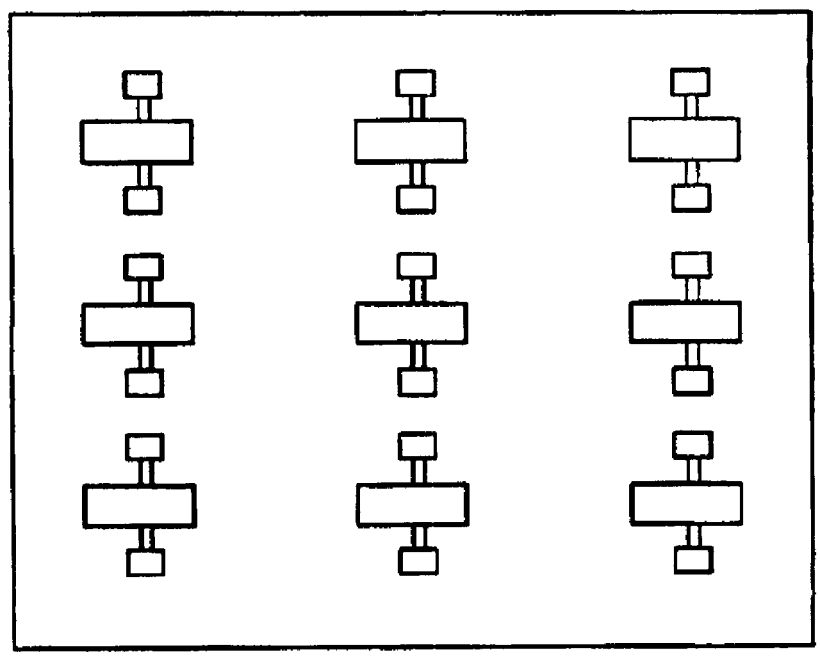
Figure 22:
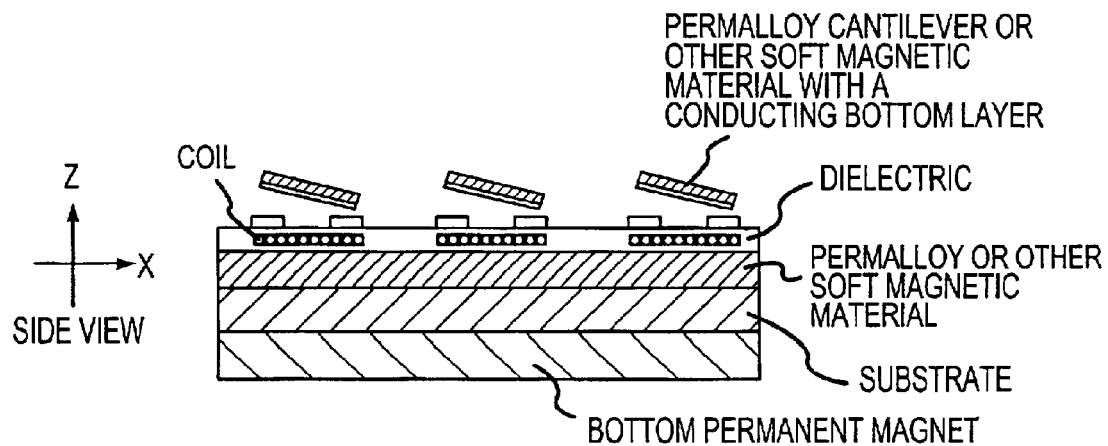
Figure 23:
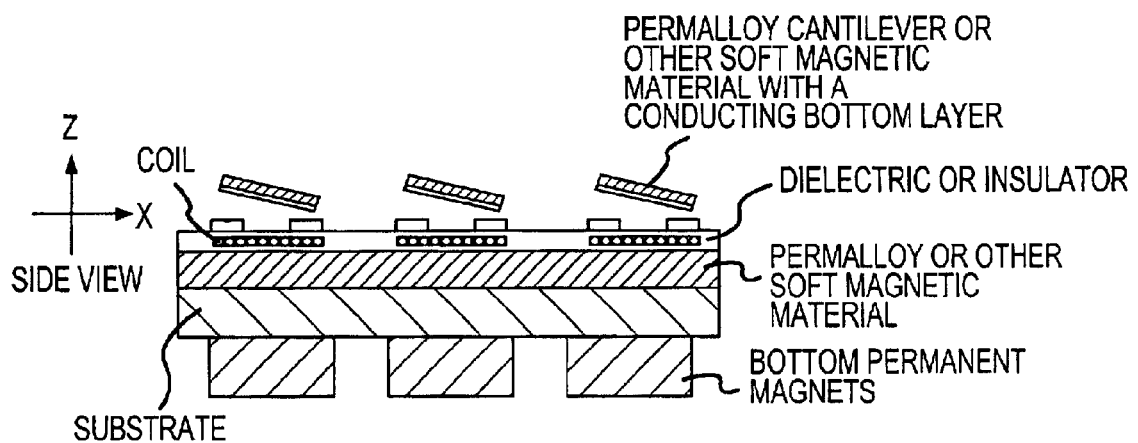
Figure 24:
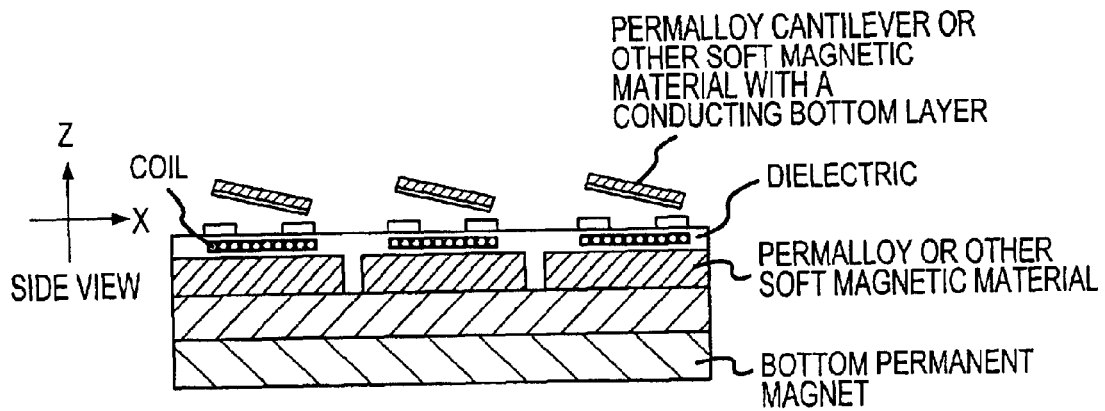
Figure 25:
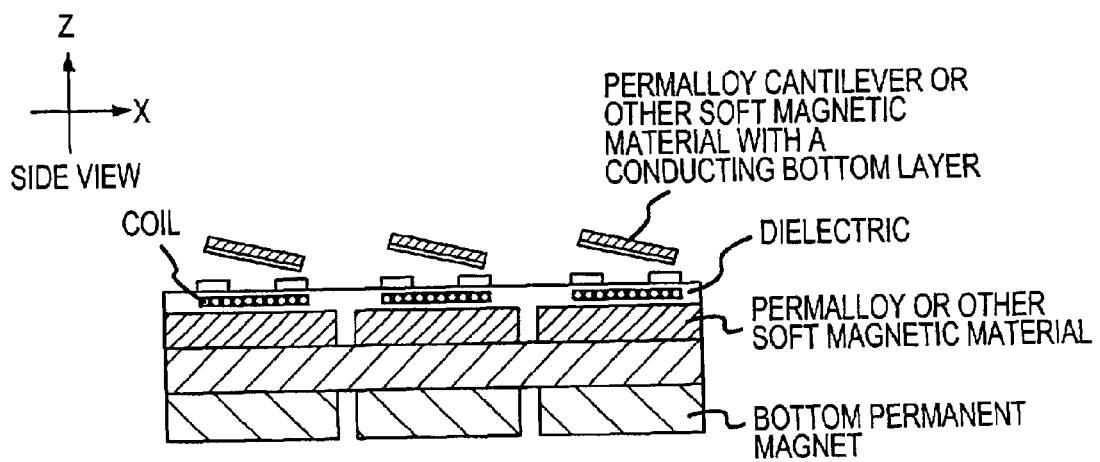
Figure 26:
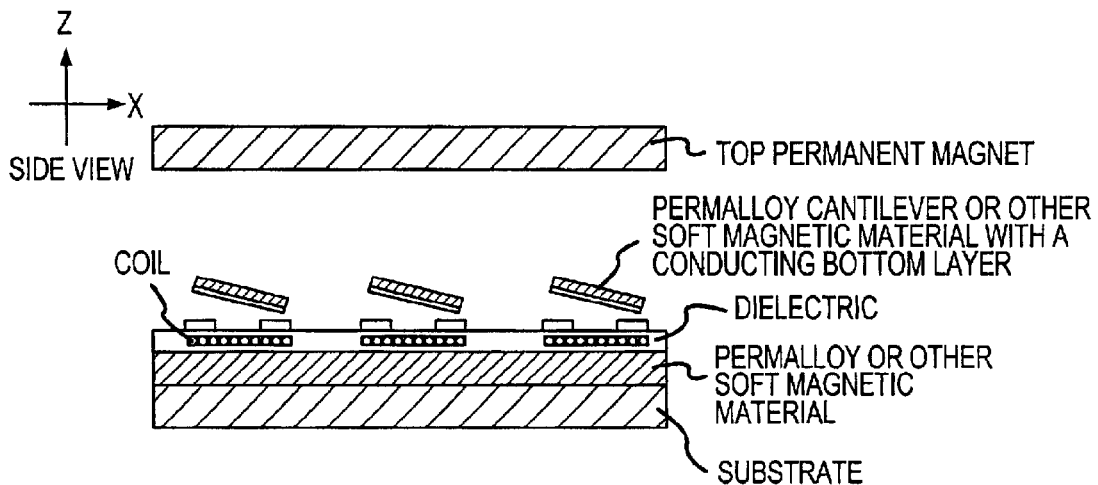
Figure 27:
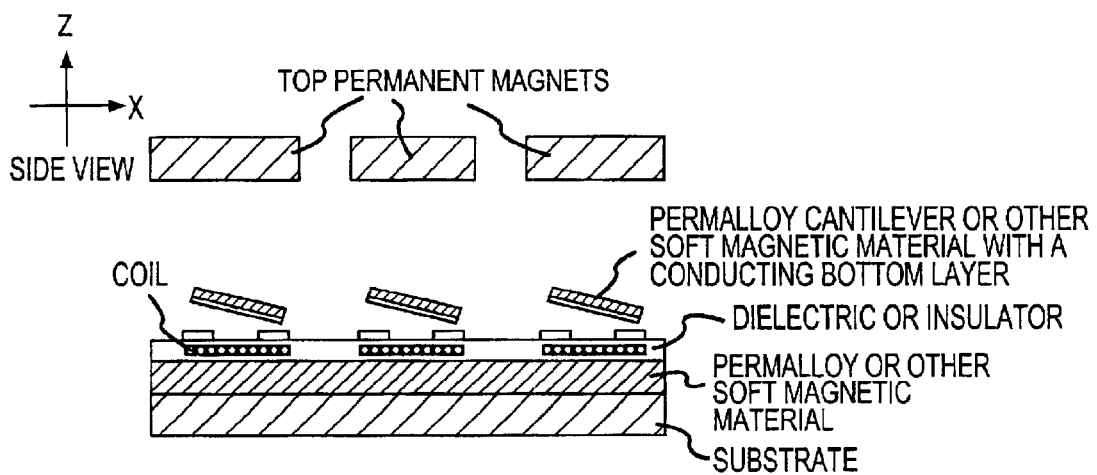
Figure 28:
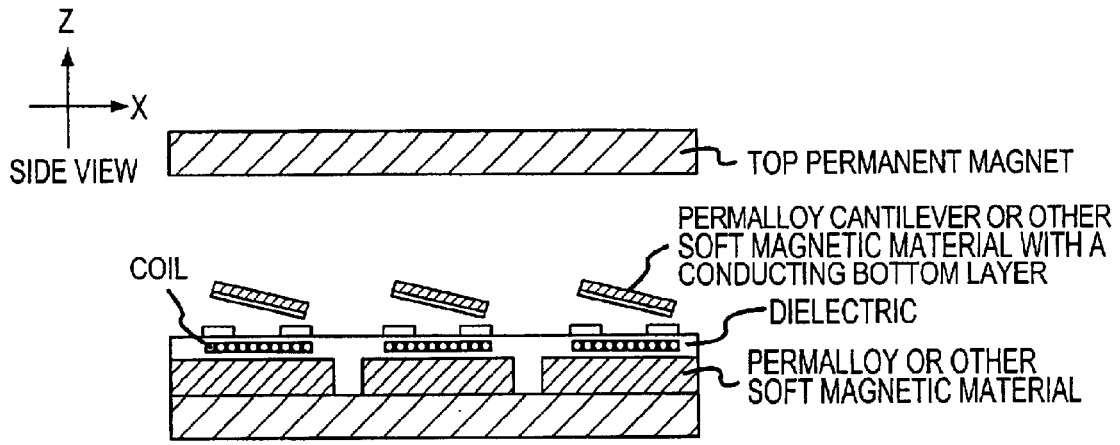
Figure 29:
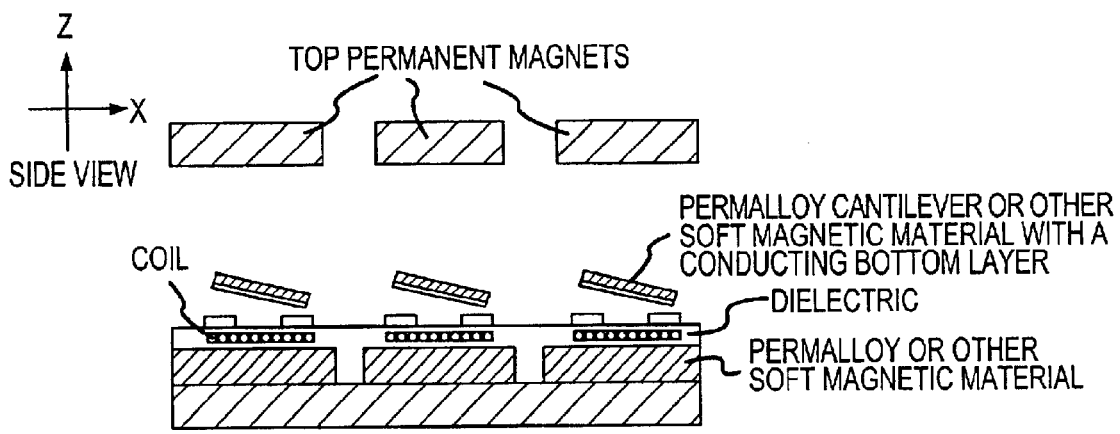

By fabricating switch units beside each other, a device array m×n can be formed (m and n are any arbitrary positive integral numbers). This is shown in FIGS. 20–21. FIG. 20 is a top view of an array with only one row of switches. FIG. 21 is a top view of an array with 3 rows of switches. Relaxed magnet alignment for an array of switches can follow any of the above-described arrangements of permanent magnets and permalloy layers. The embodiments of FIGS. 22–29 are provided for illustration only, not by limitation.

Other Embodiments

Figure 30A:
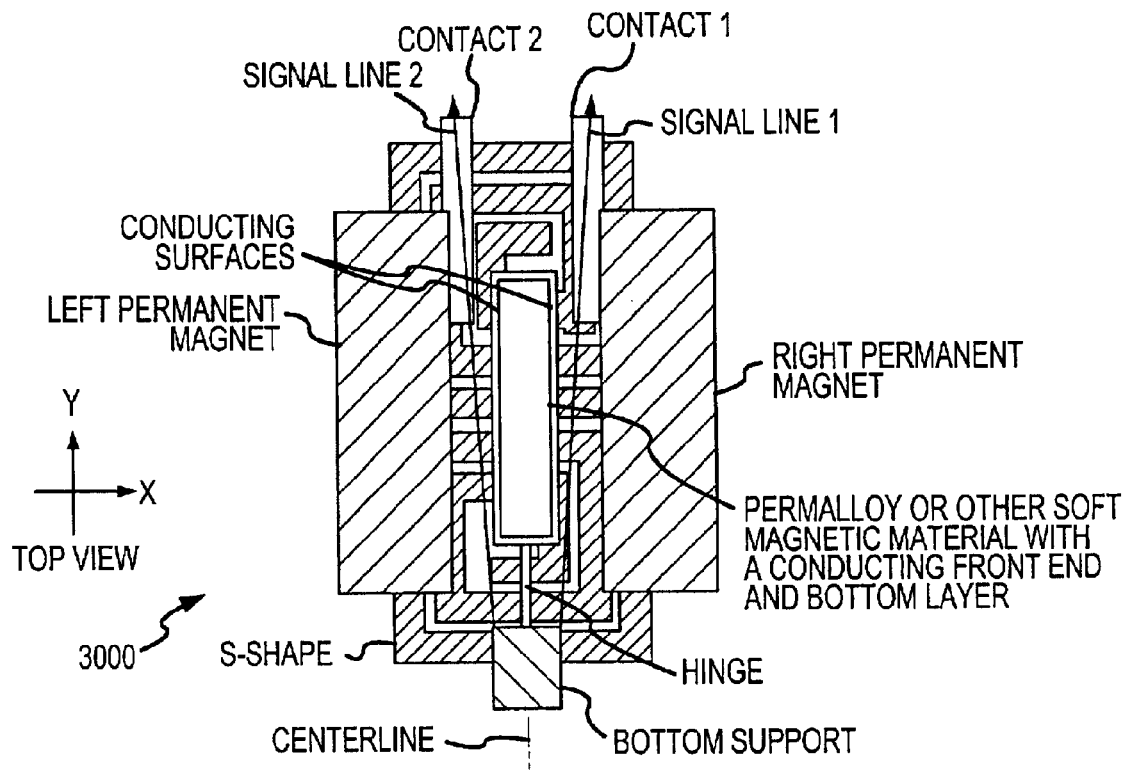
FIGS. 30A and 30B show a top view and an end view, respectively, of yet another embodiment of the micro-magnetic latching switch according to the present invention, but in this case the cantilever moves sideways instead of up and down.
Figure 30B:
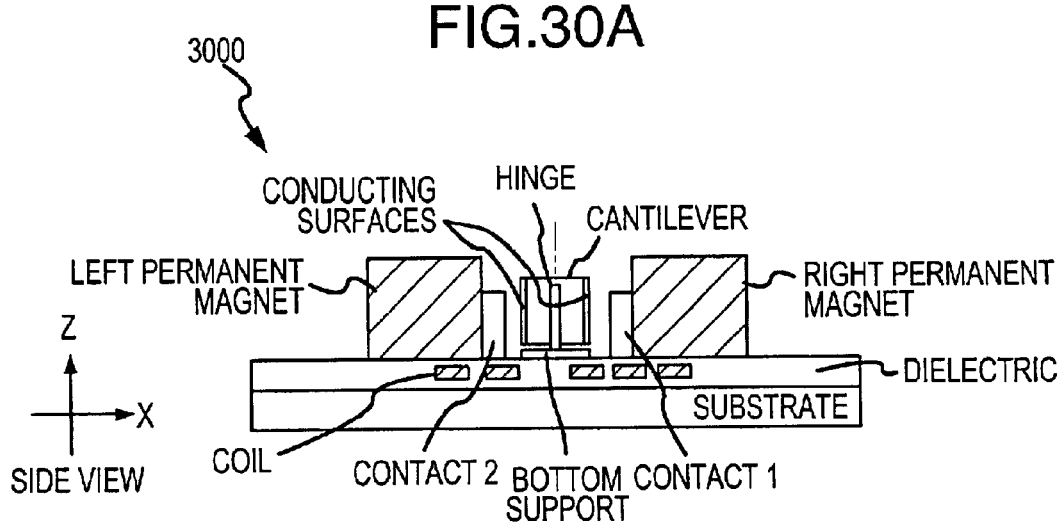

FIGS. 30A and 30B show a top view and an end view, respectively, of yet another embodiment of the micro-magnetic latching switch, but in this case the cantilever moves sideways instead of up and down. A single-pole double-throw (SPDT) micro-magnetic latching switch 3000 comprises of the following basic elements: a cantilever made of soft magnetic material (e.g., pernalloy) and conducting layers, cantilever-supporting hinges, contacts that serve as the signal lines, an S-shape planar conducting coil, a substrate, and a left and a right permanent magnets (e.g., Neodymium) forming a magnetic dipole. The magnetization orientations of the two magnets are the same (either along +X or along –X at the same time). The whole device is housed in a suitable package (not shown) with proper sealing and electrical contact leads.

The two permanent magnets provide a constant uniform magnetic field in the region where the cantilever resides. The two distances of the magnets from the cantilever vertical plane are approximately equal if the two magnets are the same (thickness and magnetization, etc.). If the thicknesses are not equal, then the two distances should be designed so that the magnetic field lines are perpendicular to the vertical plane. Also, the cantilever center should be located approximately near the line connecting the centers of the magnets.

The S-shape coil produces the switching magnetic field to switch the cantilever from one state to the other. The permanent magnetic field holds (latches) the cantilever to either state. When the cantilever toggles to the right, the cantilever's right-hand conductor (e.g., Au) touches the right contact and connects the signal line 1. In this case, the signal line 2 is disconnected. On the other hand, when the cantilever toggles to the left, the signal line 2 is connected and signal line 1 is disconnected. It forms a SPDT latching switch. Several other variations are possible, for example, one of the two permanent magnets may not necessarily be permanent magnets, one permanent magnet plus a soft magnet would still form a dipole to provide the uniform field lines at the central region of the dipole.

Figure 31:
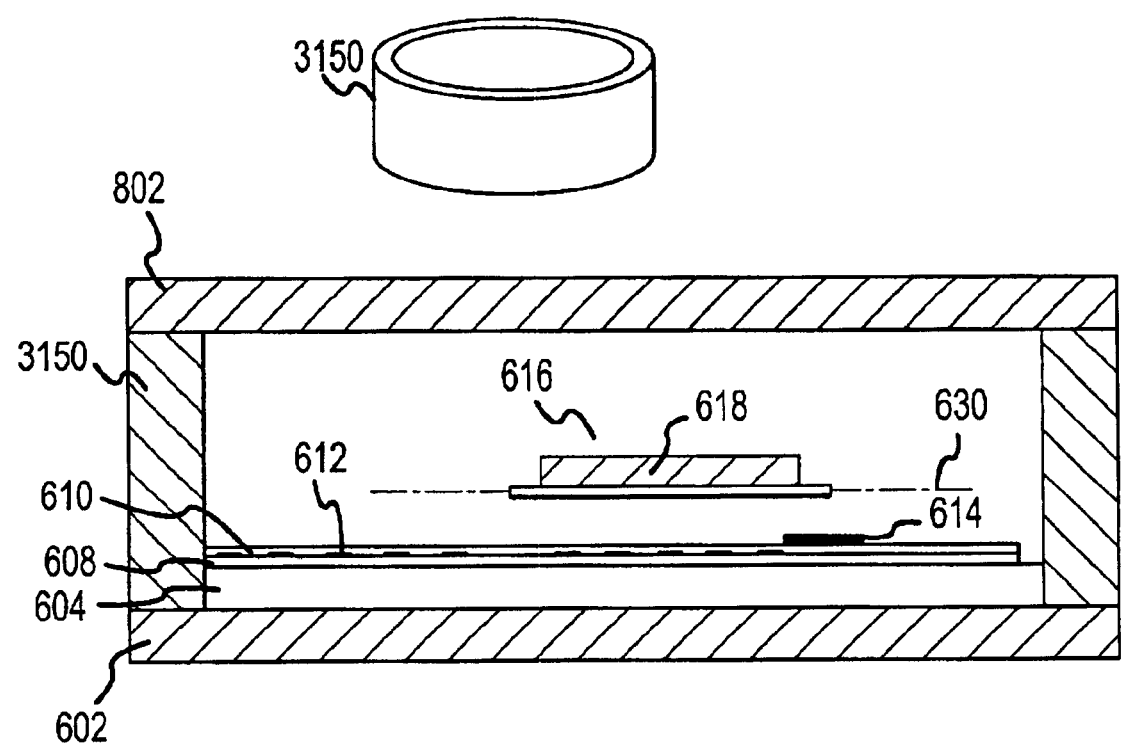
FIG. 31 shows another embodiment ofthe micro-magnetic latching switch according to the present invention.

FIG. 31 shows another embodiment of the micro-magnetic latching switch. In this embodiment, a cylindrical permanent magnet 3150, having a hollow or tubular shape with a central axis A, and being vertically magnetized, is used to provide the static magnetic field. High-permeability magnetic layers 602 and 802 are placed on the top and bottom of the permanent magnet 3150 to reduce the horizontal field component near cantilever 616.

Figure 32A:
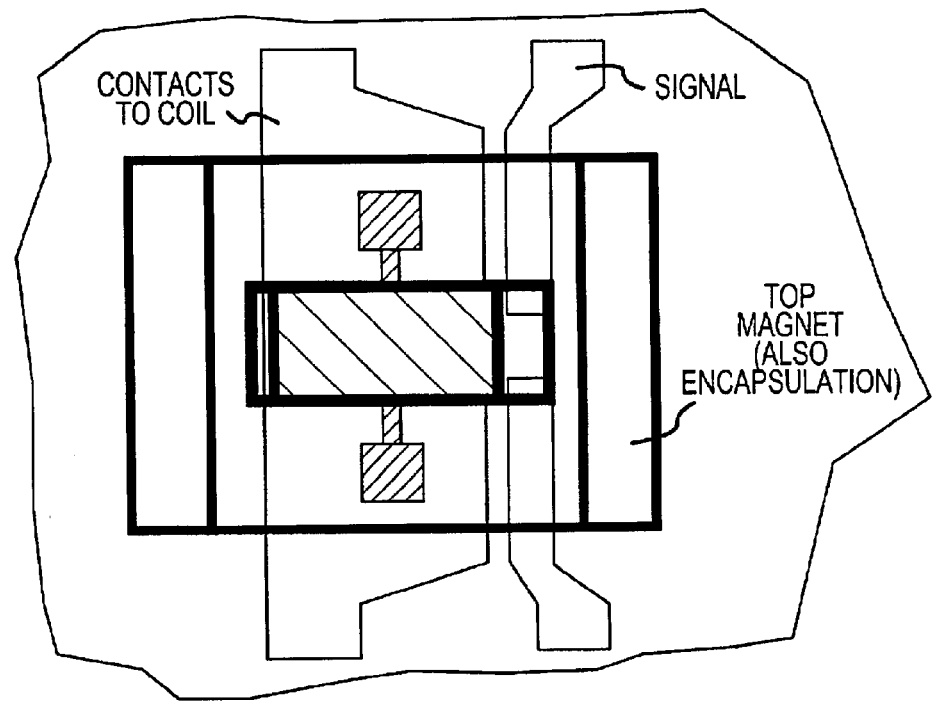
FIGS. 32A and 32B show a top view and a side view, respectively, of an embodiment to integrate the micro-magnetic latching switch with other active/passive semiconductor devices and circuits, together with the permanent magnets according to the present invention.
Figure 32B:
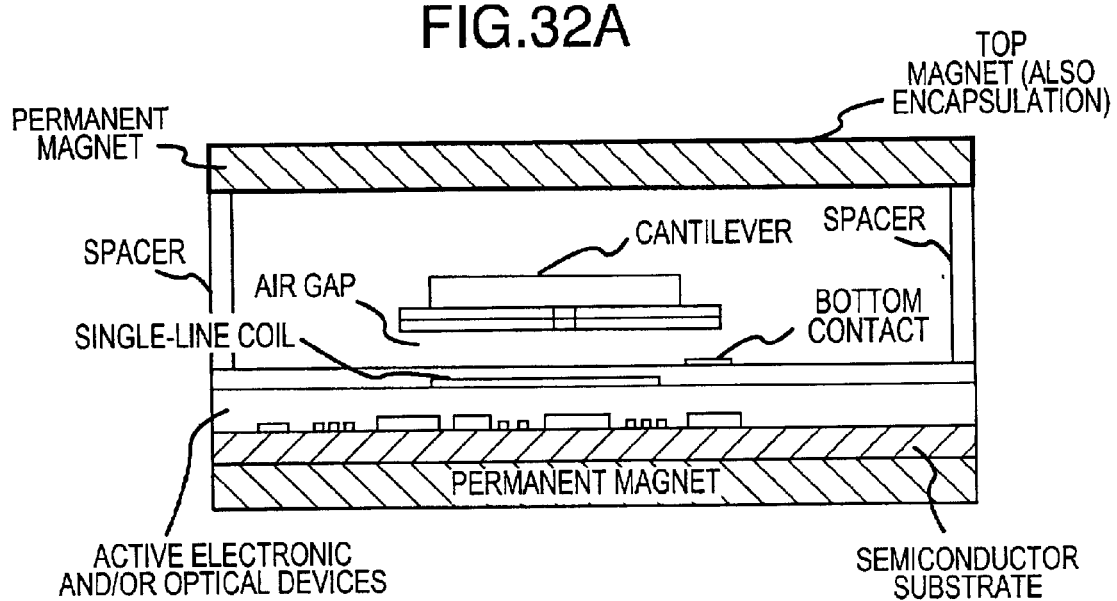

FIGS. 32A and 32B show a top view and a side view, respectively, of an embodiment to integrate the micro-magnetic latching switch with other active/passive semiconductor devices and circuits, together with the permanent magnets. The permanent magnets can be off-the-shelf magnets (e.g., Neodymium), or integrated polymer magnets using screen printing and patterning techniques. Single-line coil switches can be used to save space. Thus, the micro-magnetic latching switch of the present invention can be monolithically integrated with active semiconductor electronic and/or optical devices.

Figure 33:
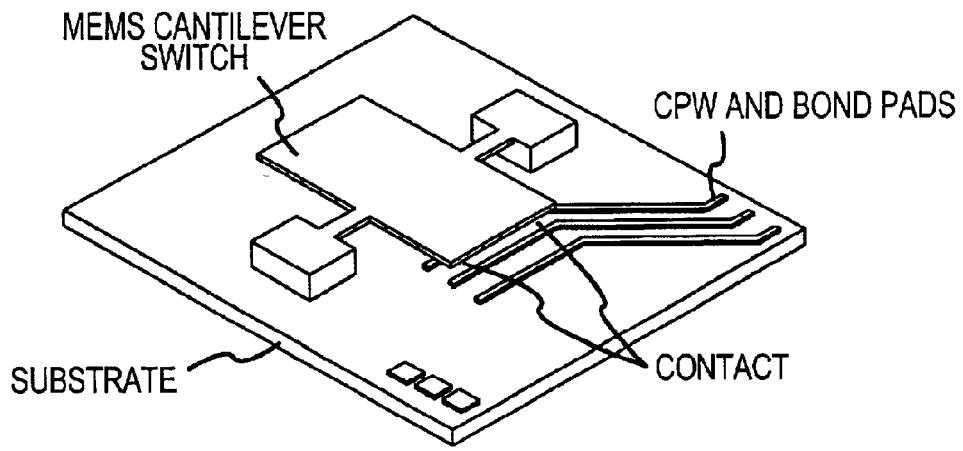
FIGS. 33–35 show yet another method to produce RF MEMS micro-magnetic latching switches using a CPW architecture according to the present invention.
Figure 34:
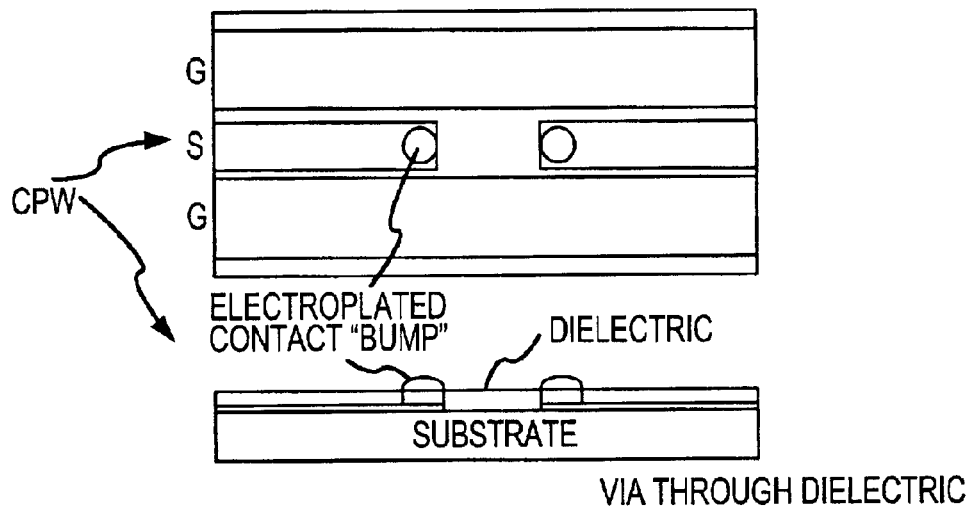
Figure 35:
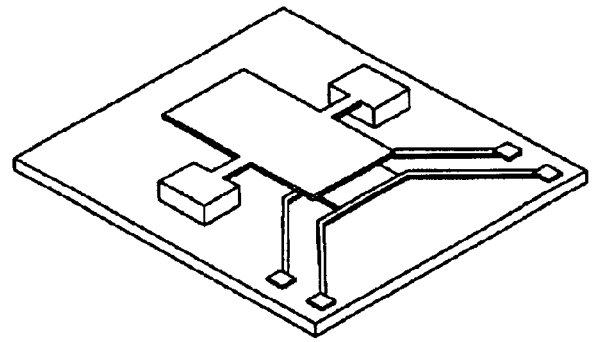

FIGS. 35—35 show yet another method to produce RF MEMS micro-magnetic latching switches using a CPW architecture. A cantilever switch is situated to one side of a coplanar waveguide (CPW), which is shown in a ground-signal-ground configuration in FIG. 33. The active switching component of the device is a movable cantilever that electrically shunts a gap in an on-chip CPW to turn the switch ON and opens the gap to turn the switch OFF. To ensure the cantilever makes contact to only the center conductor of the CPW, contact "bumps" are electroplated as shown in FIG. 33. An alternative approach to ensure proper contact alignment is achieved between the cantilever and CPW is described in FIG. 34. The bends in the CPW both shorten their overall length, and isolate much of the waveguide and bond pads from the bulk of the device.

FIG. 34 shows a method to relax alignment tolerance of the CPW switch of FIG. 33. Using the above CPW architecture (FIG. 33), the moving cantilever contacts must be precisely aligned with the contact bumps of the center conductor or the cantilever may short to one of the adjacent ground lines. The solution relies on fully covering the CPW with a planar dielectric material and then opening holes or vias to expose the contact points at either side of the gap (and the contact pads). Conductive material such as gold is then electroplated to fill the via and create a raised contact "bump" on the surface.

FIG. 35 shows a planar dielectric layer used to separate the top conductor from the underlying ground plane (not shown in the figure). The bends in the CPW both shorten their overall length, and isolate much of the waveguide and bond pads from the bulk of the device.

Optical Switches

The mechanisms, principles and techniques described above in conjunction with electrical relays may also be used to create optical switches suitable for use in communications or other optical systems. In various embodiments of an optical switch, the magnetically sensitive portion of cantilever may be affixed to a mirror or other material that reflects light. As the cantilever is switched from an "open" state to a "closed" state, the reflecting surface is exposed or hidden from an optical signal such that the signal is reflected or absorbed as appropriate, and as described more fully below.

Figure 36A:
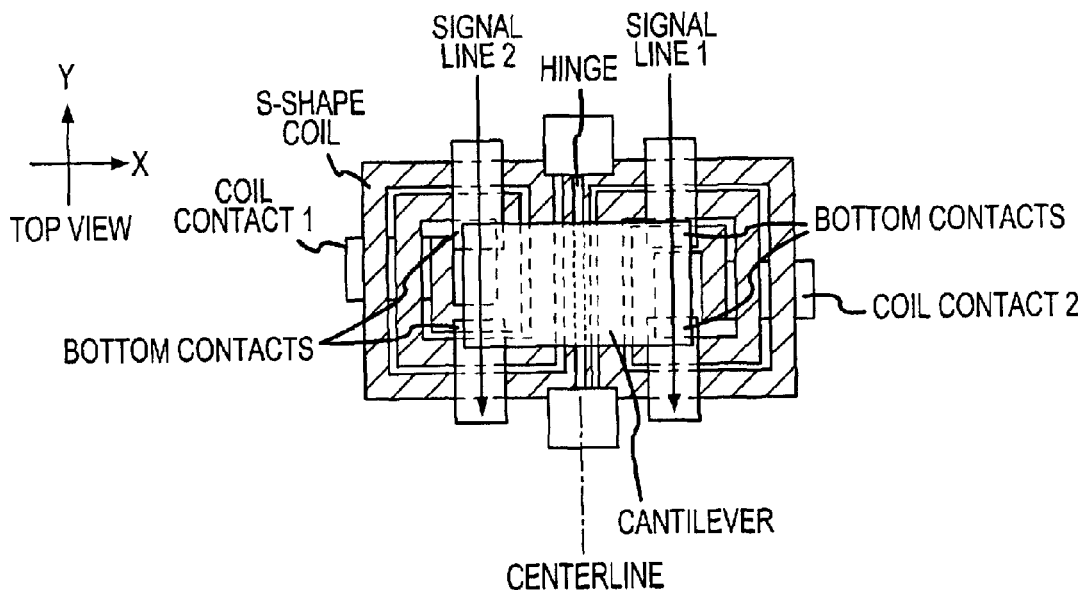
FIGS. 36A and 36B show a top view and side view, respectively, of an optical switch with a permanent magnet located on the bottom of the substrate according to the present invention.
Figure 36B:
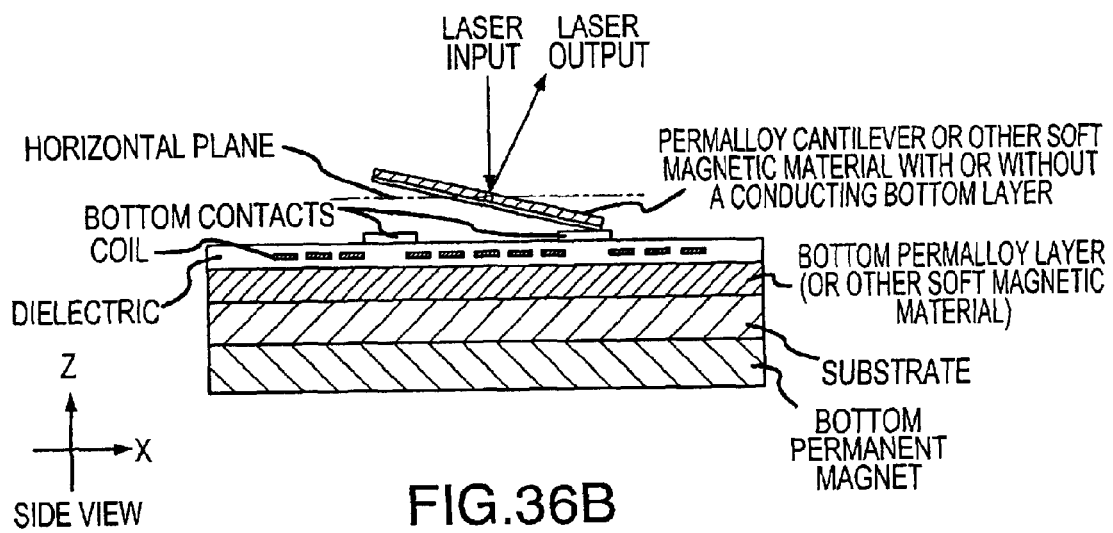

The cantilever of the switch can also serve as a reflecting mirror. FIGS. 36A and 36B show a top view and side view, respectively, of an optical switch with a permanent magnet located (e.g., mounted) on the bottom of the substrate. The electrical contacts under the cantilever provide a convenient way to check the status of the cantilever by electrically reading the status of the signal lines. However, these electrical contacts are not necessitated. Light to be switched impinges the reflective (e.g., mirrored) surface of the cantilever and is either deflected (e.g., output) to the right or the left, depending on the state of the switch. An S-shape coil is illustrated, but other coil configurations can be used, as would be apparent to a personal skilled in the relevant art based on the disclosure herein. Moreover, other relaxed alignment configurations as described above can be used to implement an optical switch.

Figure 37A:
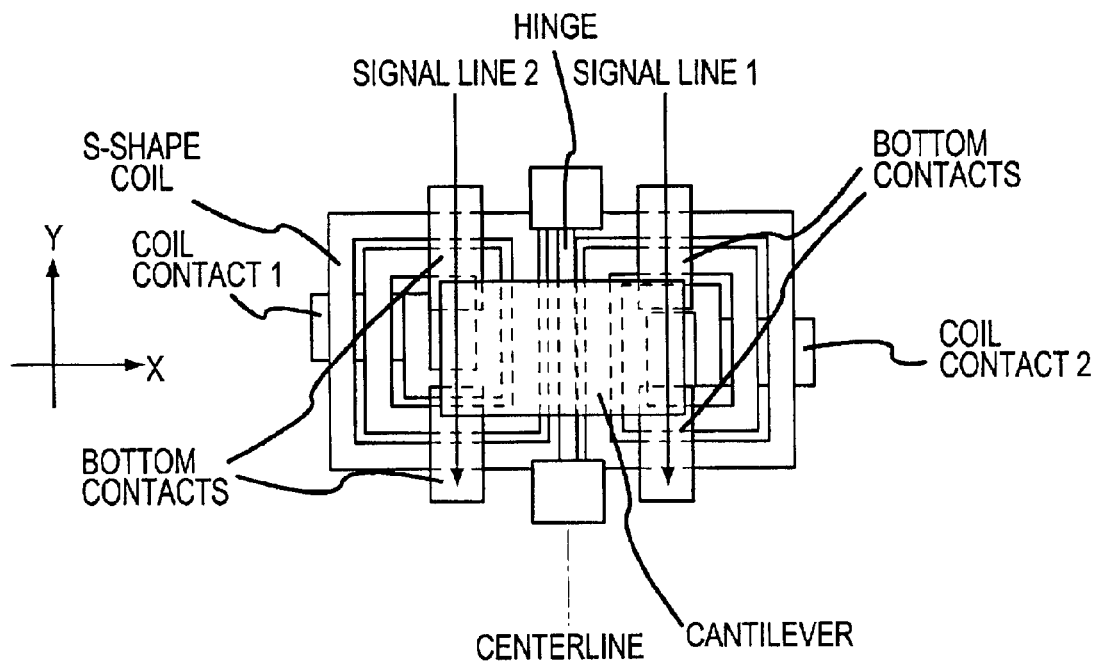
FIGS. 37A–D show another embodiment of an optical switch, which includes a top permanent magnet according to the present invention.
Figure 37B:
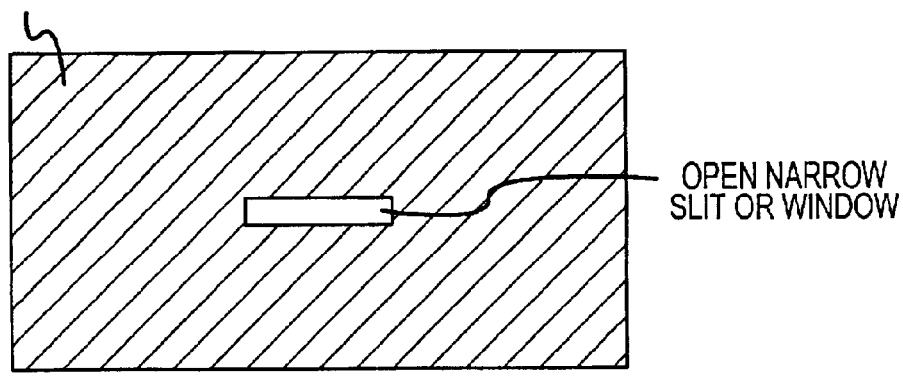
Figure 37C:
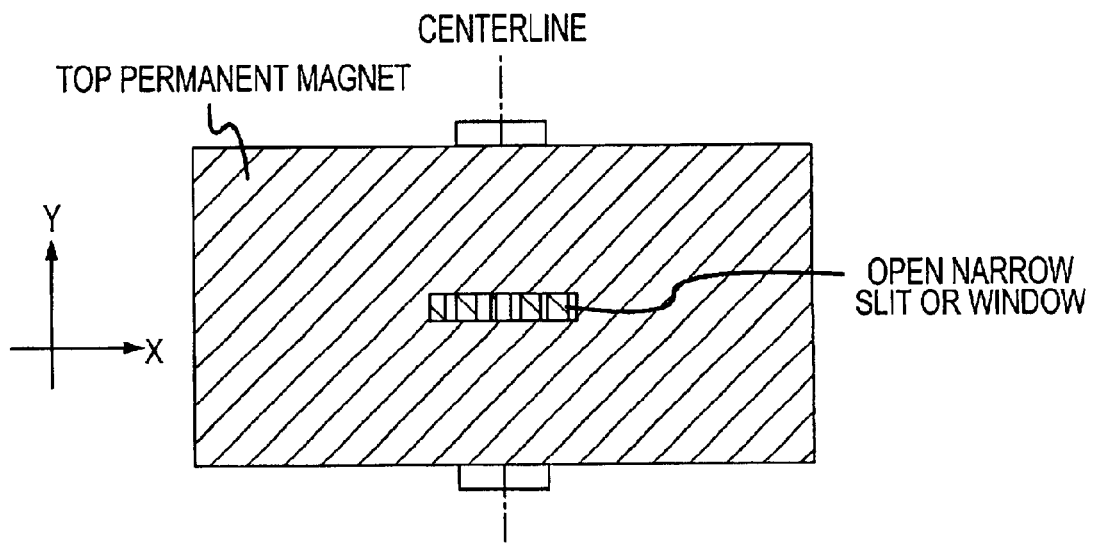
Figure 37D:
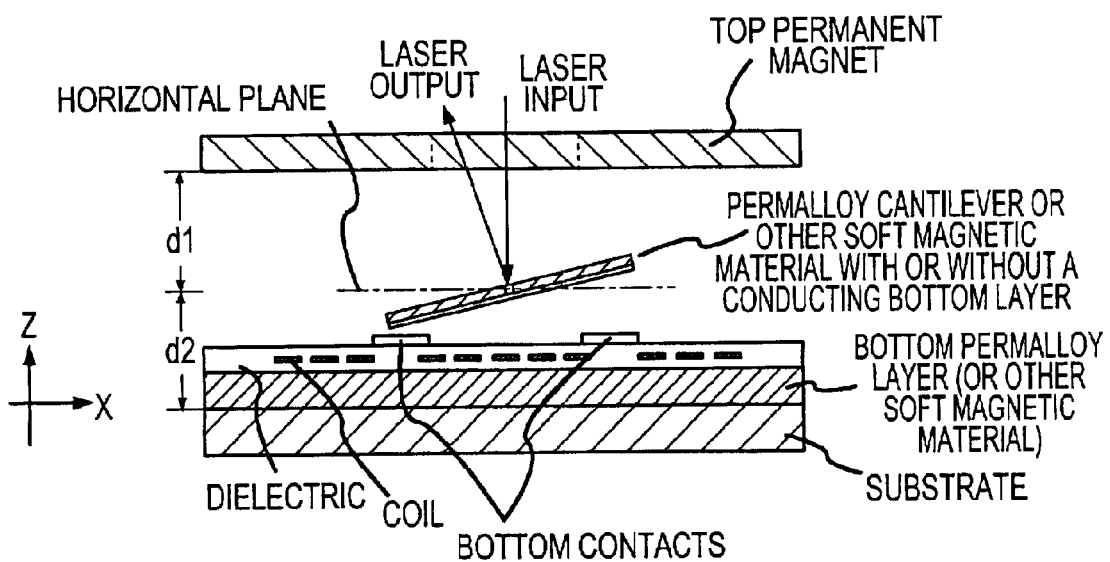

For example, another embodiment of an optical switch is shown in FIGS. 37A–D, which include a top permanent magnet. FIG. 37A shows the parts of the optical switch before permanent is mounted above the cantilever. FIG. 37B shows the top permanent with a narrow slit before being mounted above the cantilever. FIG. 37C is a top view of optical switch after the permanent magnet is assembled on top of the cantilever. The parts under the magnet cannot be seen as they are blocked by the top permanent magnet FIG. 37D is a side view of optical switch with the permanent magnet assembled on top of the cantilever. The light (e.g., input laser beam) travels through the narrow slit in the magnet and reaches the surface of the cantilever, then it is reflected by the cantilever, and finally it goes out through the slit in a different direction with respect to the input laser direction.

Figure 38A:
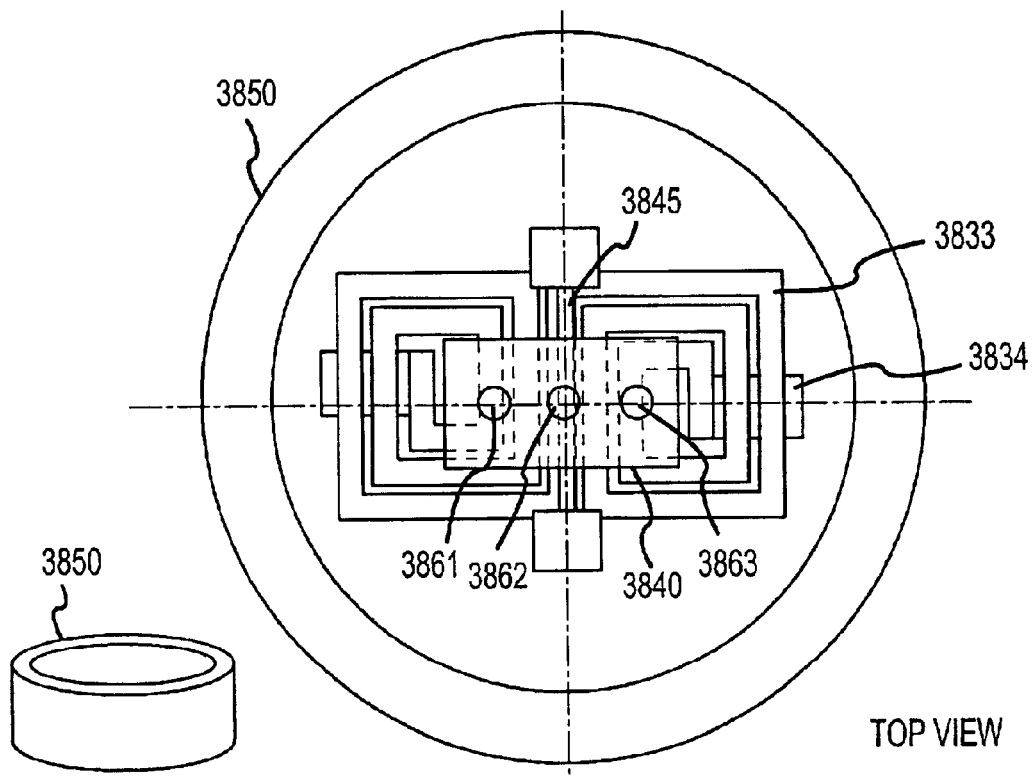
FIGS. 38A–B show still another embodiment of an optical switch according to the present invention.
Figure 38B:
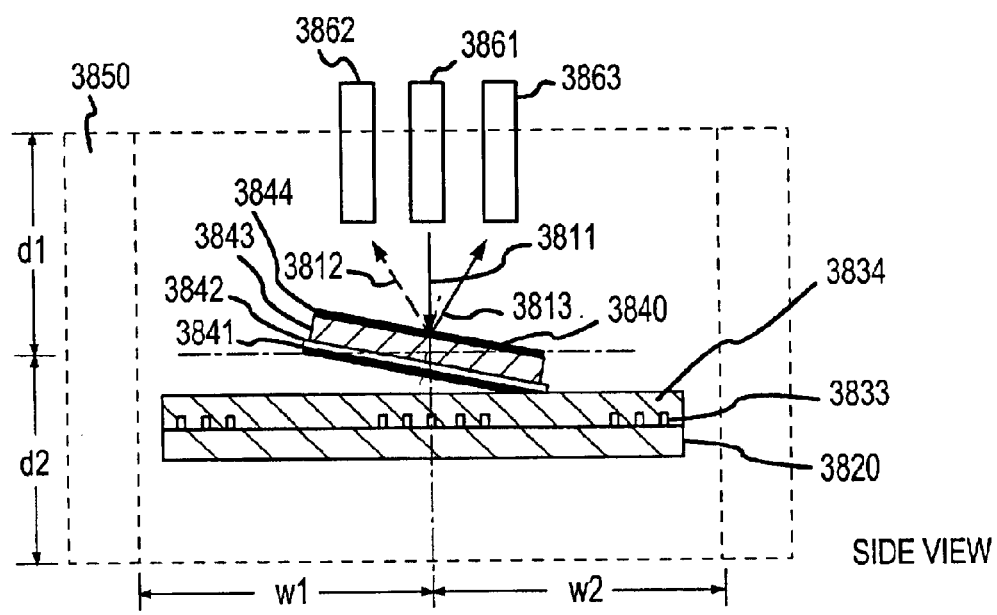

Still another example of an optical switch is shown in FIGS. 38A–B, which include a cylindrical magnet. The optical switch comprises the following basic elements: a substrate 3820, conducting coil 3833, dielectric layer 3834, cantilever 3840 (bottom seed layer 3841, thin permalloy (or other material) layer 3842, soft magnetic layer 3843, and reflective layer 3844), torsion spring 3845, optical fiber lines 3861, 3862, 3863 (with proper endings, lens, etc.), and a cylindrical permanent magnet 3850 (or any other shapes that provide a uniform magnetic field perpendicular to the cantilever surface). The distances d1, d2, w1, w2 are chosen so that cantilever 3840 is in or near the center the magnet. In this configuration, the cantilever mirror 3840 has two stable positions as explained above. Current pulse through coil 3833 switches cantilever mirror 3840 between the two stable states. Optical signals 3861 from optical fiber 3861 is projected onto cantilever mirror 3840 and is reflected to the right optical fiber 3863 (indicated by the arrow 3813) or to the left optical fiber 3862 (indicated by the arrow 3812). This forms a 1×2 optical switch. The embodiment can readily be extended to form n×2n optical switch arrays.

Packaging

Packaging of integrated circuits for radio frequency applications, such as micro-magnetic latching switches addressed by the present invention, is not a trivial a concern. Various conventional packaging techniques can be used, such as wire or ribbon bonding, flipchip or even wafer-scale packaging. It is important that external magnetic and/or electrical fields do not interfere with the latching function of the micro-magnetic switch. Thus, metal plates or housings of various shapes and configurations can be employed to prevent external fields from affecting operation of the switch. As would become apparent to a person skilled in the art, various metals, metal alloys and energy absorbing materials or layers can be employed. The shape, thickness, and other dimensions of such plates, housings or layers are implementation dependant, as would also become apparent to a person skilled in the art based on the teachings herein.

Application Specific Uses of Micro-magnetic latching switches

The micro-magnetic latching switches of the present invention can be used in a plethora of products including household and industrial appliances, consumer electronics, military hardware, medical devices and vehicles of all types, just to name a few broad categories of goods. Although several of the following described embodiments are not illustrated in the figures, the written description and other illustrated embodiments are sufficient to enable those skilled in the art to make and use the present invention.

Conclusion

While various embodiments of the present invention have been described above, it should be understood that they have been presented by way of example, and not limitation. It will be apparent to persons skilled in the relevant art that various changes in form and detail can be made therein without departing from the spirit and scope ofthe invention. This is especially true in light oftechnology and terms within the relevant art(s) that may be later developed.

The present invention has been described above with the aid of structural and functional building blocks, elements, or modules illustrating the performance of specified functions and relationships thereof. The boundaries of these building blocks have been defined herein for the convenience ofthe description. Alternate structures and boundaries can be defined so long as the specified structure, functions and relationships thereof are appropriately performed. Any such alternate boundaries are thus within the scope and spirit ofthe claimed invention. One skilled in the art will recognize that these building blocks can be implemented by know materials, discrete components, etc. Thus, the breadth and scope of the present invention should not be limited by any of the above-described exemplary embodiments, but should be defined only in accordance with the following claims and their equivalents.

What is claimed is:

1. A micro magnetic latching device, comprising:
    a substrate;
    a movables element supported by said substrate and having a magnetic material and a long axis;
    first and second magnets that produce a first magnetic field, which induces a magnetization in said magnetic material, said magnetization characterized by magnetization vector pointing in a direction along said long axis at said moveable element, wherein said first magnetic field is approximately perpendicular to a major central portion of said long axis; and a coil that produces a second magnetic field to switch said movable element between two stable states, wherein only temporary application of said second magnetic field is required to change direction of said magnetization vector thereby causing said movable element to switch between said two stable states.

2. The device of claim 1, wherein said first magnet is a permanent magnet that is substantially planar and substantially parallel to said substrate.

3. The device of claim 2, wherein said second magnet is a permalloy layer that is substantially planar and substantially parallel to said substrate.

4. The device of claim 3, wherein said permalloy layer is located between said substrate and said movable element.

5. The device of claim wherein said permalloy layer is located on an opposite side of said substrate from a side of said substrata that supports said movable element.

6. The device of claim 4, further comprising a second permalloy layer located on an opposite side of said substrate from a side of said substrate that supports said movable element.

7. The device of claim 4, wherein said movable element is located between said permalloy layer and said permanent magnet.

8. The device of claim 5, wherein said movable element is located between said substrate and said permanent magnet.

9. The device of claim 1, wherein said magnetic material comprises a permalloy.

* * * * *